US012719101B2

(12) United States Patent
Schache et al.

(10) Patent No.: US 12,719,101 B2
(45) Date of Patent: Aug. 25, 2026

(54) MODULAR THERMAL MANAGEMENT SYSTEM CONTROL

(71) Applicant: Caterpillar Inc., Peoria, IL (US)

(72) Inventors: Bryan Kent Schache, Dunlap, IL (US); Scott Alan Tipton, Washington, IL (US)

(73) Assignee: Caterpillar Inc., Peoria, IL (US)

(*) Notice: Subject to any disclaimer, the term of this patent is extended or adjusted under 35 U.S.C. 154(b) by 777 days.

(21) Appl. No.: 18/054,828

(22) Filed: Nov. 11, 2022

(65) Prior Publication Data

US 2024/0162522 A1 May 16, 2024

(51) Int. Cl.

| | |
|---|---|
| ***H01M 10/63*** | (2014.01) |
| ***H01M 10/48*** | (2006.01) |
| ***H01M 10/613*** | (2014.01) |
| ***H01M 10/615*** | (2014.01) |
| ***H01M 10/625*** | (2014.01) |
| ***H01M 10/6556*** | (2014.01) |
| ***H01M 10/6567*** | (2014.01) |

(52) U.S. Cl.

CPC ......... *H01M 10/63* (2015.04); *H01M 10/486* (2013.01); *H01M 10/6556* (2015.04); *H01M 10/6567* (2015.04); *H01M 10/613* (2015.04); *H01M 10/615* (2015.04); *H01M 10/625* (2015.04); *H01M 2220/20* (2013.01)

(58) Field of Classification Search

None

See application file for complete search history.

(56) References Cited

U.S. PATENT DOCUMENTS

| | | |
|---|---|---|
| 8,297,069 B2 | 10/2012 | Novotny et al. |
| 8,734,975 B2 | 5/2014 | Burrows et al. |
| 9,281,547 B2 | 3/2016 | Maguire et al. |
| 9,287,726 B2 | 3/2016 | Gao et al. |

(Continued)

FOREIGN PATENT DOCUMENTS

| | | | |
|---|---|---|---|
| CN | 105958138 A | 9/2016 | |
| CN | 106655323 A * | 5/2017 | .......... H02J 7/00041 |

(Continued)

OTHER PUBLICATIONS

Song et al. CN106655323A English machine translation (Year: 2017).*

(Continued)

*Primary Examiner* — Susan D Leong

(57) ABSTRACT

A modular and on-demand battery thermal management system (BTMS) for an electric machine with a battery is disclosed. The BTMS may include one or more independently operable BTMS modules, where each BTMS module may be configured to cool a corresponding component of the electric machine, such as a particular battery pack. Each BTMS module, in turn, may include a plurality of BTMS units that cool coolant that is to be delivered to the components that are to be cooled within the electric machine. The individual BTMS units may be independently operable by a BTMS controller based at least in part on the cooling needs of the components to be cooled. The BTMS controller is also configured to select BTMS units to operate in a manner that maximizes the operating life and durability of the BTMS.

9 Claims, 8 Drawing Sheets

(56) References Cited

U.S. PATENT DOCUMENTS

| | | | | |
|---|---|---|---|---|
| 9,308,828 | B2 | 4/2016 | Wu et al. | |
| 10,256,515 | B2 | 4/2019 | Basu et al. | |
| 11,133,540 | B2 | 9/2021 | Dunham et al. | |
| 11,214,115 | B2 | 1/2022 | Harper et al. | |
| 11,217,841 | B2 | 1/2022 | Lee | |
| 11,264,655 | B2 | 3/2022 | Bell et al. | |
| 2015/0280294 | A1* | 10/2015 | Shin | B60L 58/26<br>429/50 |

FOREIGN PATENT DOCUMENTS

| | | | | |
|---|---|---|---|---|
| CN | 108515875 | A * | 9/2018 | H01M 10/613 |
| CN | 108736109 | A | 11/2018 | |
| CN | 113183715 | A | 7/2021 | |
| CN | 113285140 | A | 8/2021 | |
| EP | 4088965 | A1 | 11/2022 | |
| KR | 20160019181 | A | 2/2016 | |
| WO | WO2017190699 | A1 | 11/2017 | |

OTHER PUBLICATIONS

Ma et al. CN108515875A English machine translation (Year: 2018).*

Written Opinion and International Search Report for Int'l. Patent Appln. No. PCT/US2023/076179, mailed Jan. 25, 2024 (5 pgs).

* cited by examiner

MODULAR THERMAL MANAGEMENT SYSTEM CONTROL

TECHNICAL FIELD

The present disclosure relates to a modular thermal management system and its control. More specifically, the present disclosure relates to control of modular thermal management systems that provide variable levels of cooling of batteries.

BACKGROUND

Machines, such as mining trucks, loaders, dozers, compaction machines, or other construction or mining equipment, are beginning to be powered by electricity, such as from an on-board electric battery. Machines powered by electricity are used for building, construction, mining and other activities. For example, mining trucks are often used for hauling mined materials from mining sites. It is desirable to power these types of machines using alternative energy, such as electricity that is stored in a battery. Electric machines, for example, may benefit from reduced emissions of carbon (e.g., carbon dioxide), particulates (e.g., diesel soot), nitrogen oxides (e.g., NOx), and/or organic (e.g., volatile organic compounds (VOC)) emissions relative to traditional fuel (e.g., diesel, gasoline, etc.) powered machines.

While electric machinery may provide various improvements, such as environmental advantages, electric machinery may also present new challenges, such as thermal management of the battery or batteries of the electric machine. Batteries of electric machines generally have a thermal operating range that is tighter than other components of the electric machine. For example, the operating temperature range within which a battery may be operated may be about 20° C. or less. For example, an ideal range of battery operating temperatures may be between 10° C. and 30° C. The aforementioned temperature values are merely examples and actual operating temperature values for various batteries may be different from the aforementioned values. Significant excursions outside of acceptable operating temperature ranges of the battery of an electric machine may result in reduced, and sometimes significantly reduced, battery lifetimes, and possibility of failure of the battery. Thus, not controlling the operating temperature of the battery of an electric machine can result in significant cost and/or downtime that manifest in additional cost and/or delays of construction, mining, and/or farming tasks.

Batteries of electric machines further present the challenge of controlling the battery temperature while being operated in a wide variety of operating conditions. For example, when a significant amount of charge is drawn from a battery, such as when the electric machine is used to perform a particularly energy consuming task, the battery may generate significantly more heat than when the electric machine is resting or performing a less energy intensive task. As a result, the cooling needs for operating the battery may be variable, depending on the tasks being performed by the electric machine. Additionally, the battery of an electric machine may need to be cooled while the battery is being charged.

One mechanism for thermal management of a battery is described in U.S. Pat. No. 8,734,975 (hereinafter referred to as "the '975 reference"). The '975 reference describes individual battery cells within each battery module 14 are heated and cooled with liquid coolant from the thermal management system 10. The '975 reference describes that the thermal management system 10 includes a plurality of modular manifold segments 16 which are adapted to connect to each of the cooling channels or heat exchanger fins for each battery cell. However, the systems and methods described in the '975 reference does not pertain to a controlled variable cooling of the battery. Thus, the disclosure of the '975 reference does not describe how to control the temperature of a battery within an operating range while the battery is operated in a wide range of conditions with a highly variable level of thermal output.

Examples of the present disclosure are directed toward overcoming one or more of the deficiencies noted above.

SUMMARY

In an aspect of the present disclosure, a machine includes a motor to propel the machine, a battery configured to power the motor, a battery controller configured to report a temperature associated with the battery, and a battery thermal management system (BTMS). The BTMS includes a first BTMS unit, a second BTMS unit, wherein the first BTMS unit and the second BTMS unit are independently operable, and a BTMS controller. The BTMS controller is configured to receive a temperature level associated with the battery, identify a first operating time associated with the first BTMS unit, and identify a second operating time associated with the second BTMS unit. The BTMS controller is further configured to determine, based at least in part on the temperature level, the first operating time, and the second operating time, that the first BTMS unit is to be actively operated, and cause the first BTMS unit to actively operate.

In another aspect of the present disclosure, a method of cooling a battery includes receiving, by a battery thermal management system (BTMS) controller, a temperature level associated with the battery and determining, by the BTMS controller, that the temperature level is greater than a threshold level. The method further includes identifying, by the BTMS controller and based at least in part on the temperature level being greater than the threshold level, that a first BTMS module is to be operated to cool the battery, the first BTMS module including a first BTMS unit and a second BTMS unit, determining, by the BTMS controller and based at least in part on the temperature level, that one of the first BTMS unit or the second BTMS unit is to be operated in an active mode, and causing, by the BTMS controller, one of the first BTMS unit or the second BTMS unit to operate in the active mode.

In yet another aspect of the present disclosure, a system includes a battery thermal management system (BTMS) controller including one or more processors and one or more computer-readable media storing computer-executable instructions that, when executed by the BTMS controller, cause the BTMS controller to receive a temperature level associated with a battery pack, determine, based at least in part on the temperature level that a first BTMS module is to be operated to cool the battery pack, the first BTMS module including a first BTMS unit and a second BTMS unit, and identify a first active operating time associated with the first BTMS unit. The computer-executable instructions, when executed by the BTMS controller, further cause the BTMS controller to identify a second active operating time associated with the second BTMS unit, determine, based at least in part on the temperature level, the first operating time, and the second operating time, that the first BTMS unit is to be operated in an active mode, and cause the first BTMS unit to operate in the active mode.

DETAILED DESCRIPTION

Wherever possible, the same reference numbers will be used throughout the drawings to refer to the same or like parts.

Figure 1:
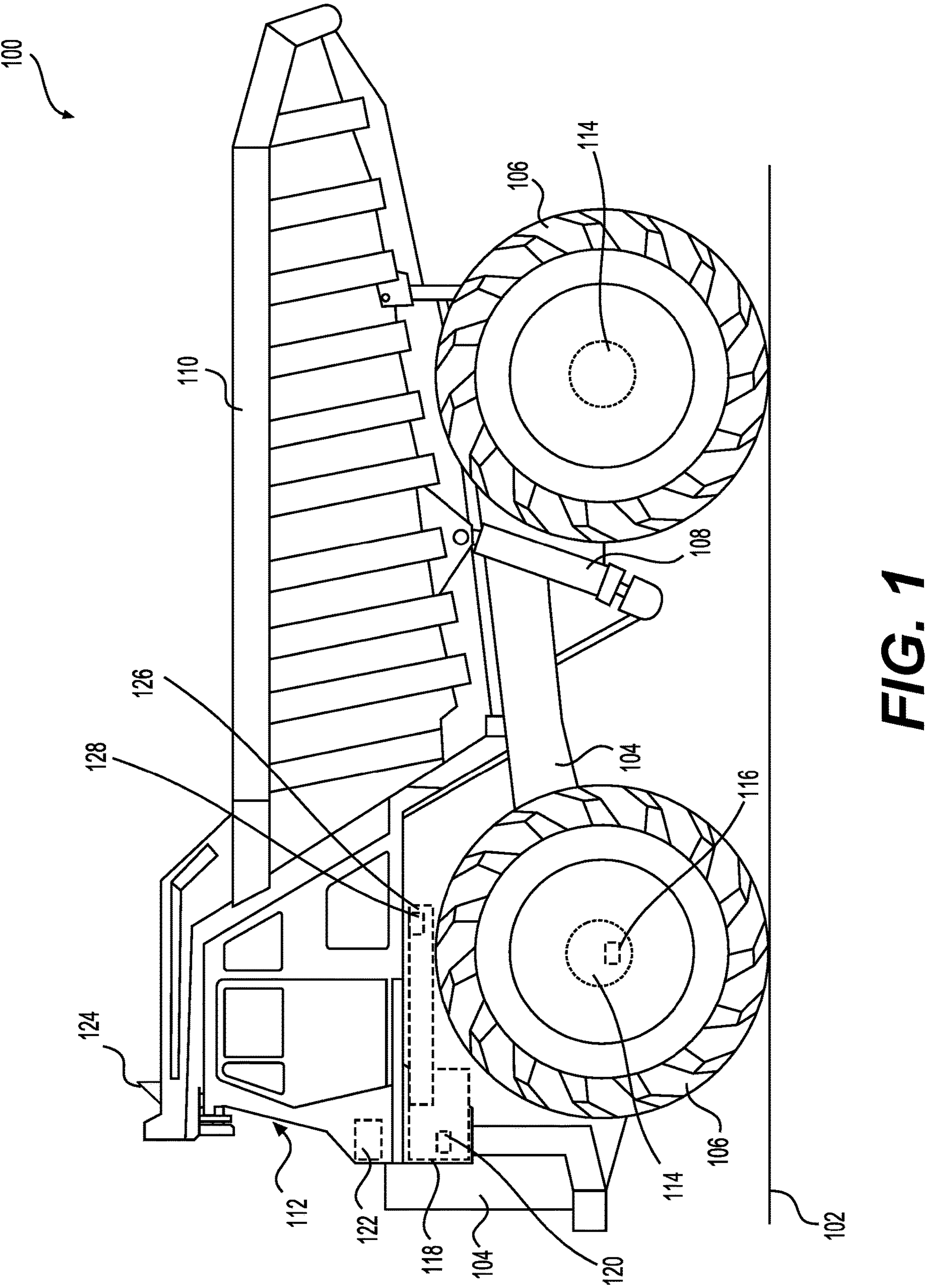
FIG. 1 is a schematic illustration of an example electric machine with a battery thermal management system (BTMS), according to examples of the disclosure.

FIG. 1 is a schematic illustration of an example electric machine 100, in accordance with examples of the disclosure. The electric machine 100, although depicted as a mining truck type of machine, may be any suitable machine, such as any type of loader, dozer, dump truck, skid loader, excavator, compaction machine, backhoe, combine, crane, drilling equipment, tank, trencher, tractor, any suitable stationary machine, any variety of generator, locomotive, marine engines, combinations thereof, or the like. The electric machine 100 is configured for propulsion using electricity. However, in some cases the electric machine may also be configured for propulsion using other fuels, in addition to electricity, such as diesel, gasoline, hydrogen and/or hydrogen containing compounds, such as various hydrocarbons (methane, ethane, propane, butane, pentane, hexane, combinations thereof, or the like), compressed natural gas (CNG), natural gas, liquified natural gas (LNG), combinations thereof, or the like. In other words, the systems and methods, as discussed herein, may apply to both electric machines 100, as well as hybrid machines.

The electric machine 100 is illustrated as a mining truck, which is used, for example, for moving mined materials, heavy construction materials, equipment, and/or the like. The electric machine 100 may be used for road construction, building construction, mining, paving and/or other construction applications. For example, the electric machine 100 is used in situations where materials, such as mineral ores, loose stone, gravel, soil, sand, concrete, and/or other materials of a worksite need to be transported over a surface 102 at a worksite. As discussed herein, the electric machine 100 may also be in the form of a dozer, where the electric machine 100 is used to redistribute and/or move material on the surface 102. Further still, the electric machine 100 may be in the form of a compaction machine that can traverse the surface 102 and impart vibrational forces to compact the surface 102. Such a compaction machine includes drums, which may vibrate to impart energy to the surface 102 for compaction. For example, an electric compaction machine is configured to compact freshly deposited asphalt and/or other materials disposed on and/or associated with the surface 102, such as to build a road or parking lot. As yet another example, the electric machine 100 can be in the form of a combine for harvesting grains. It should be understood that the electric machine 100 can be in the form of any other type of suitable construction, mining, farming, military, and/or transportation machine. In the interest of brevity, without individually discussing every type of construction and/or mining machine, it should be understood that the electric drive mechanisms, as described herein, are configured for use in a wide variety of electric powered machine 100.

As shown in FIG. 1, the electric machine 100 includes a frame 104 and wheels 106. The wheels 106 may be mechanically coupled to a drive train (not shown) to propel the electric machine 100. When the wheels 106 of the electric machine 100 are caused to rotate, the electric machine 100 traverses the surface 102. Although illustrated in FIG. 1 as having a hub with a rubber tire, in other examples, the wheels 106 may instead be in the form of drums, chain drives, combinations thereof, or the like.

The electric machine 100 may include a hydraulic system 108 that move a dump box 110 or other moveable elements configured to move, lift, carry, and/or dump materials. The dump box 110 is used, for example, to pick up and carry dirt or mined ore from one location on the surface 102 to another location of the surface 102. The dump box 110 is actuated by the hydraulic system 108, or any other suitable mechanical system. In some cases, the hydraulic system 108 is powered by an electric motor (not shown), such as by powering hydraulic pump(s) (not shown) of the hydraulic system 108. It should be noted that in other types of machines (e.g., machines other than a mining truck) the hydraulic system 108 may be in a different configuration than the one shown herein, may be used to operate elements other than a dump box 110, and/or may be omitted.

With continued reference to FIG. 1, the electric machine 100 may include an operator station 112. The operator station 112 is configured to seat an operator (not shown) therein. The operator seated in the operator station 112 interacts with various control interfaces and/or actuators within the operator station 112 to control movement of various components of the electric machine 100 and/or the overall movement of the electric machine 100 itself.

Thus, control interfaces and/or actuators within the operator station 112 allow the control of the propulsion of the electric machine 100 by controlling operation of one or more motors 114. A motor controller 116 may be controlled according to operator inputs received at the operator station 112. The motors 114 may be powered by a battery system or battery 118, with a battery controller 120. Battery 118, as used herein, may refer to a battery system, batteries (in the plural), or any suitable collection of electrochemical energy storage devices arranged in any suitable manner and with any suitable partitions thereto. The one or more motors 114, in some examples, may be directly coupled to a corresponding wheel 106. In other cases, the one or more motors 114 may be mechanically coupled to the corresponding wheel 106 via one or more mechanical couplers, such as a transmission system (not shown).

The motors 114 may be of any suitable type, such as induction motors, permanent magnet motors, switched reluctance (SR) motors, combinations thereof, or the like. The motors 114 are of any suitable voltage, current, and/or power rating. The motors 114 when operating together are configured to propel the electric machine 100 as needed for tasks that are to be performed by the electric machine 100. The motor controller 116 includes one or more control electronics to control the operation of the motors 114. In some cases, each motor 114 may be controlled by its own motor controller 116. In other cases, all the motors 114 of the electric machine 100 may be controlled by a single motor controller 116. The motor controller 116 may further include one or more inverters or other circuitry to control the energizing of magnetic flux generating elements (e.g., coils) of the motors 114. The motors 114 are mechanically coupled to a variety of drive train components, such as a drive shaft and/or axles or directly to the wheels 106 to rotate the wheels 106 and propel the electric machine 100. The drivetrain may include any variety of other components including, but not limited to a differential, connector(s), constant velocity (CV) joints, etc. Although not shown here, there may be one or more motors 114 that are not used for propulsion of the electric machine 100, but rather to operate pumps and/or other auxiliary components, such as to operate the hydraulic systems 108.

According to examples of the disclosure, the power to energize the motors 114 is received from the battery 118. As discussed herein, the battery 118, as referred to herein, may represent a battery system, a collection of batteries, and/or any suitable hierarchy of a collection of electrolytic cells. As shown, the battery 118 is on-board or carried by the electric machine 100. In some example cases, the motors 114 may operate solely from the power stored in the battery 118. In other example cases, the motors 114 may operate from the battery 118 and/or other off-machine sources of energy, such as an electrified trolley line from which the electric machine 100 can draw power. In yet other example cases, the motors 114 may operate from energy stored in the battery 118, as well as one or more other sources of on-board electrical power, such as a fuel cell. For example, in a fuel cell powered machine, the battery 118 may be used to provide spike power levels, as fuel cells tend to provide a steady level of power that is challenging to increase and/or decrease quickly in response to power needs. According to examples of the disclosure, the battery 118, both individually or along with other sources of power, may provide power for operating the motors 114 and/or other power consuming components (e.g., power electronics, controllers, cooling systems, displays, actuators, sensors, etc.) of the electric machine 100.

The battery 118 may be of any suitable type and capacity. For example, the battery may be a lithium iron phosphate ($LiFePO_4$ or LFP) battery, lithium-ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. The battery 118, as discussed herein may be suitable for liquid cooling. The battery 118 may be organized as a collection of electrochemical cells arranged to provide the voltage, current, and/or power requirements of the motors 114. In some cases, the energy capacity of the battery 118 may be sufficient to power the electric machine 100 for several hours or even a whole day. In other cases, the battery 118 capacity may be such that the battery can power the electric machine 100 anywhere from about 30 minutes to about 3 hours. In yet other cases, the battery 118 may only store enough energy to power the electric machine 100 for about 30 minutes or less. It should be understood that the aforementioned values are examples, and the disclosure contemplates battery 118 energy capacity of any suitable value, including ranges outside of the aforementioned ranges.

Regardless of the capacity, type, or whether the battery 118 is the only source of energy for the electric machine 100, the battery 118 may be organized in any suitable way. For example, the battery 118 include any number of cells (not shown), which may be organized in any number of different battery modules (not shown), which may further be organized as battery packs (not shown in FIG. 1) and/or battery groups. For example, there may be a single battery pack for the battery 118. In other cases, the battery 118 may include two separate battery packs. In yet other cases, there may be three, four, or indeed, any suitable number of battery packs or other partitions within the battery 118. Although this disclosure uses the term "pack," it should be understood that the disclosure contemplates other terms for sections of batteries, such as sections that include a collection of cells. Some of these other portions of the battery may be groups, packs, sections, modules, or the like. In other cases, the battery 118 may actually be a battery system with multiple batteries therein. Again, with respect to this disclosure, partitions (e.g., battery packs) of a battery 118 or battery system may be independently temperature controlled.

The battery controller 120 may be configured to allow the battery 118 to provide power to various components of the electric machine, such as the motors 114, electronics, controllers, etc. of the electric machine 100. The battery controller 120 may also be configured to provide a variety of information, such as to other controllers of the electric machine 100 pertaining to the battery 118. In some examples, the battery controller 120 may be configured to provide individual information about individual modules, cells, or other segments or partitions of the battery 118. In some cases, the battery controller 120 may periodically send data about the battery 118 to another controller or other entity. In the same or other cases, the battery controller 120 may send data about the battery when requested to do so, such as by another controller of the electric machine 100.

The battery controller 120 may, in examples, determine information about the battery 118 from any suitable source, such as any variety of sensors, such as a temperature sensor. For example, the battery 118 may have associated temperature sensors (not shown) that can provide temperatures for individual modules and/or cells of the battery 118 to the battery controller 120. The battery controller 120 may receive signals from any variety of these sensors associated with the battery and determine physical measurements therefrom. For example, the battery controller 120 may receive a signal from a thermocouple of a battery cell and determine the associated temperature of that battery cell from the received signal from the thermocouple. In addition to temperature of cells within the battery 118, the battery controller 120 may be configured to receive sensor signals associated with cooling fluids (e.g., coolant) used to cool the battery 118. For example, the battery controller 120 may be configured to determine the coolant inlet temperature, the coolant outlet temperature, the coolant inlet pressure, and/or the coolant outlet pressure of any coolant used to cool the battery 118 during operation and/or charging.

The electric machine 100 includes an electronic control module (ECM) 122 that controls various aspects of the electric machine 100. The ECM 122 is configured to receive battery status (e.g., state-of-charge (SOC) or other charge related metrics) from the battery controller 120, operator signal(s), such as an accelerator signal, based at least in part on the operator's interactions with one or more control interfaces and/or actuators of the electric machine 100. In other cases, the ECM 122 may receive control signals from a remote control system by wireless signals, received via an antenna 124. The ECM 122 uses the operator signal(s), regardless of whether they are received from an operator in the operator station 112 or from a remote controller, to generate command signals to control various components of the electric machine 100. For example, the ECM 122 may control the motors 114 via the motor controller 116, the hydraulic system 108, and/or steering of the electric machine 100 using respective controllers (not shown). It should be understood that the ECM 122 may control any variety of other subsystems of the electric machine 100 that are not explicitly discussed here to provide the electric machine 100 with the operational capability discussed herein.

The ECM 122 may include single or multiple microprocessors, field programmable gate arrays (FPGAs), digital signal processors (DSPs), and/or other components configured to control the electric machine 100. Numerous commercially available microprocessors can be configured to perform the functions of the ECM 122. Various known circuits are operably connected to and/or otherwise associated with the ECM 122 and/or the other circuitry of the electric machine 100. Such circuits and/or circuit components may include power supply circuitry, inverter circuitry, signal-conditioning circuitry, actuator driver circuitry, etc. The present disclosure, in any manner, is not restricted to the type of ECM 122 or the positioning depicted of the ECM 122 and/or the other components relative to the electric machine 100. The ECM 122 is configured to control the use of energy from the battery 118 and may cooperate with other controllers of the electric machine 100 in a manner that enhances the range or performance of the electric machine 100. In some cases, the ECM 122 may also provide the control functions for cooling the battery 118 that is discussed herein.

The electric machine 100 further includes a battery thermal management system (BTMS) 126. The BTMS 126 is configured to provide coolant to the battery 118 to maintain the temperature of the battery 118 and/or portions thereof within an acceptable operating range. The operating range of the battery 118 to which temperature may be controlled by the BTMS 126 may be a range that provides for reduced chances of failure of the battery 118 and/or greater chances of long-term longevity of the battery 118. Overheating of batteries 118, particularly of the type of batteries 118 used on the electric machine 100 may result in failure (e.g., explosion, leak, etc.) of the battery and/or a reduced overall lifetime of the battery 118. For example, high operating temperatures of the battery 118 may lead to accelerated degradation of the electrolytes and/or the electrodes of the battery 118. To prevent battery failure and to enhance the operating lifetime of the battery 118, the BTMS is used to control the operating temperature of the battery, according to the disclosure herein. It should also be noted that although the BTMS 126 is discussed in the context of thermal management of the battery 118, the BTMS may also be used for thermal management of any suitable component of the electric machine, such as power electronics, controllers, hydraulic components, etc.

The BTMS 126 may include a BTMS controller 128 that provides control functions for modular and controllable cooling of the battery 118, depending on the thermal needs of the battery 118. The BTMS 126 has selectable levels of cooling, as will be discussed in greater detail in conjunction with FIG. 2. The BTMS controller 128 is configured to receive temperature or other operating information from one or more other entities, such as the battery controller 120, and determine the cooling needs of the BTMS 126 therefrom. For example, the BTMS controller 128 may receive a particular maximum cell temperature level of a particular module of the battery 118. The BTMS controller 128 may then operate a portion of the BTMS 126 at a level commensurate with the cooling needs of the battery pack, as determined from the received indication of the maximum cell temperature. The BTMS 126 may be modular and provides variable levels of cooling power, as instructed by the BTMS controller 128. In this way, the battery 118 is not cooled too much or too little, resulting in a dynamic cooling control to relatively tight ranges. It should be noted that in alternative examples, the functions of the BTMS controller 128, as disclosed herein, may be performed by other controllers of the electric machine, such as the ECM 122.

The electric machine 100 further includes any number of other components within the operator station 112 and/or at one or more other locations on the frame 104. These components include, for example, one or more of a location sensor (e.g., global positioning system (GPS)), an air conditioning system, a heating system, communications systems (e.g., radio, Wi-Fi connections), collision avoidance systems, sensors, cameras, etc. These systems are powered by any suitable mechanism, such as by using a direct current (DC) power supply powered by the battery 118 and/or any other source. The BTMS 126, as disclosed herein, may be used to control the temperature of any of the aforementioned components of the electric machine 100.

It should be understood that the electric machine 100 as discussed herein, provides for an improved modular BTMS 126 that can provide variable levels of cooling to any number of modules of the battery 118. The thermal management of the battery 118 using the BTMS 126 may be performed while the electric machine 100 is operational, is idling, is turned off, and/or when the battery 118 is being charged. The BTMS controller 128 may receive a variety of information about the battery 118 and/or modules thereof, such as from a battery controller 120, and control the temperature of the battery 118 and/or module thereof within a desired operating range. The BTMS controller 128 may engage multiple units of the BTMS 126, as needed to control the temperature of the battery 118 within the desired range of temperatures. As discussed herein, good control of the operating temperature of the battery 118 may result in greater longevity of the battery 118, as well as reduced chances for failure of the battery 118.

Although the BTMS 126 is discussed herein as part of the electric machine 100, it should be understood that the electric machine 100 is only one application for the BTMS 126. The BTMS 126, as disclosed herein, may be used for any suitable energy storage solution, both mobile and stationary. For example, the BTMS 126, as disclosed herein, may be deployed for stationary energy storage and/or bidirectional power grids. Furthermore, the BTMS 126 may be used for other mobile solutions other than the electric machine 100.

Figure 2:
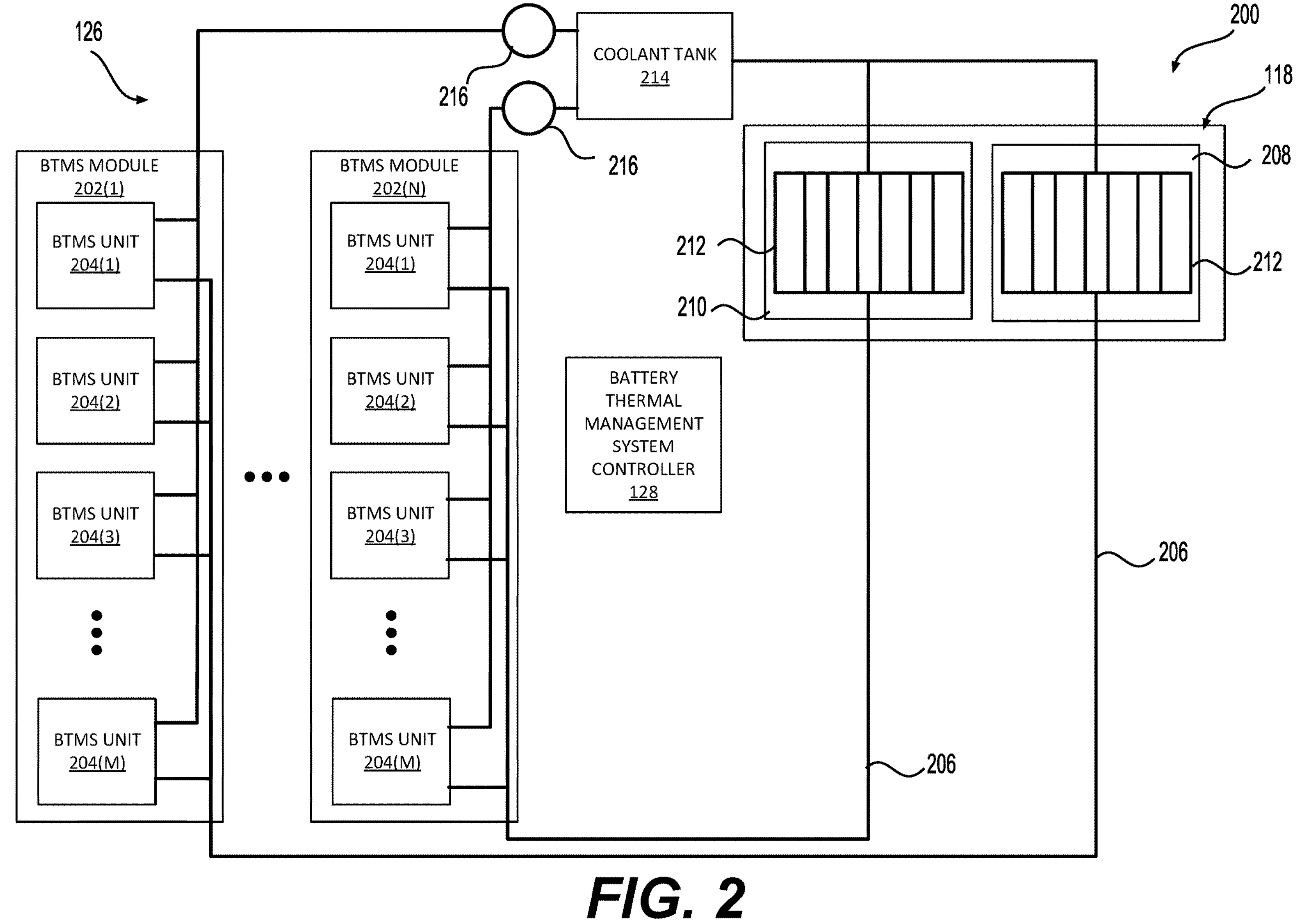
FIG. 2 is a schematic illustration depicting an environment with the battery thermal management system (BTMS) of the electric machine depicted in FIG. 1, according to examples of the disclosure.

FIG. 2 is a schematic illustration depicting an environment 200 with a battery thermal management system (BTMS) 126 of the electric machine 100 depicted in FIG. 1, according to examples of the disclosure. The BTMS 126 may be organized in one or more BTMS modules 202(1), . . . 202(N), hereinafter referred to individually as BTMS module 202 or in plurality as BTMS modules 202. Each of the BTMS modules may include a plurality of BTMS units 204(1), 204 (2), 204(3), . . . 204(M), hereinafter referred to individually as BTMS unit 204 or in plurality as BTMS units 204. The BTMS units 204 may be fluidically connected to coolant lines 206 that conduct coolant therein.

The BTMS 126 may be used to control the temperature of the battery 118. The battery 118 is depicted as having two battery packs 208, 210. In other cases, the battery 118 may have any number of different packs. In some examples, each BTMS module 202 may correspond to a battery pack 208battery pack 208, 210. In other words, each BTMS module 202 may be dedicated to cooling a corresponding respective battery pack 208battery pack 208, 210. In other cases, more than one BTMS module 202 may be used to cool a single battery pack 208battery pack 208, 210. In still other cases, one BTMS module 202 may be used to cool more than one battery pack 208battery pack 208, 210.

Each battery pack 208, 210 may be partitions of the battery 118. The battery packs 208, 210 may include a plurality of cells of the battery 118. In some cases, all of the battery packs 208, 210 of a particular battery 118 may be of the same size (e.g., contain the same number of constituent cells, supply substantially the same voltage, current, power, etc.). In other cases, the battery packs 208, 210 of the battery 118 may be of different sizes. Further, in some cases, each of the battery packs 208, 210 may have their own battery controller 120. In other cases, the battery 118 may have a single battery controller 120 that provide control, measurement, and reporting/communications functions for all of the battery packs 208, 210 of the battery 118. Although not shown here, the battery packs 208, 210 may include any number of sensors, such as temperature sensors (e.g., thermocouples). In some cases, the sensors may indicate, to the battery controller 120, the temperature of individual cells of the battery 118.

The battery controller 120 may be configured to determine the temperature of cells within the battery 118. For example, the battery controller 120 may be configured to determine the temperature of cells within each of the battery packs 208, 210. Again, it should be noted that even though two battery packs 208, 210 are shown here, in other examples, there may be any number of different battery packs 208, 210, and the battery controller 120 may be configured to determine the temperature associated with any number of battery packs 208, 210. Additionally, the battery controller 120 may determine temperature statistics associated with individual battery packs 208, 210 and report the temperature statistics to the battery thermal management system (BTMS) controller 128.

As an example, the battery controller 120 may receive a number of cell temperatures associated with battery pack 208 and determine the highest temperature and the lowest temperature of the cells (e.g., the range of cell temperatures) and report those high and low cell temperatures to the BTMS controller 128. The BTMS controller 128 may then determine the cooling needs of the battery pack 208, based at least in part on the high and low cell temperatures, as received from the battery controller 120. It should be appreciated that the cooling needs of the battery packs 208, 210 may be determined based at least in part on other temperature measurements associated with the battery packs 208, 210. The BTMS controller 128 may further operate the BTMS module 202(1) corresponding to the battery pack 208 in a manner such that the BTMS module 202(1) provides the cooling needs of the battery pack 208. In some cases, the BTMS controller 128 may determine how many and/or which ones of the BTMS units 204 to operate within the BTMS module 202(1) to provide the cooling needs of the battery pack 208. A similar procedure may be performed by the battery controller 120 and/or the BTMS controller 128 for the battery pack 210 and the corresponding BTMS module 202(N).

When the BTMS modules 202 are operated, such as by operating one, some, or all of the BTMS units 204 within that BTMS module 202, coolant may be delivered through the coolant lines 206 to heat exchangers 212 proximal to the battery packs 208, 210, to cool the respective battery pack 208battery pack 208, 210. After the coolant flows through one or more heat exchangers 212, the coolant may be conducted by the coolant lines 206 to a coolant tank 214. The coolant tank 214 may serve as a coolant reservoir, or a sump tank, from which coolant may be pumped according to the needs of the BTMS 126, as determined by the temperature of the battery 118 and/or its battery packs 208, 210. Coolant pumps 216 may be configured to pump coolant to and/or through the BTMS modules 202 and/or individual BTMS units 204. The BTMS controller 128 may also control the operation of the coolant pumps 216 to provide a correct amount of coolant flow through the BTMS modules 202, BTMS units 204, and/or the heat exchangers 212.

As shown, the BTMS modules 202 may be disposed in a parallel manner, where each BTMS module 202 has its own coolant inlet and outlet. In other words, the coolant flow in one BTMS module 202 may not have an effect on the coolant flow through another BTMS module 202. Within each BTMS module 202 the BTMS units 204 may be arranged in parallel. In other words, when multiple BTMS units 204 within a BTMS module 202 are turned on or operating, coolant may flow through all of the BTMS units 204 of the BTMS module 202. Each of the BTMS units 204 of the BTMS module 202 may operate in an active mode or in a passive mode. When operating in an active mode, the BTMS unit 204 may cool the coolant passing therethrough in an active manner. When operating in a passive mode, the coolant may pass through a radiator or other heat sink of the BTMS unit 204. Whether individual BTMS units are to operate in an active or passive mode may be determined by the BTMS controller 128 and based at least in part on temperature data associated with the battery 118 and/or the battery packs 208, 210. The operation of individual BTMS units 204 is discussed in greater detail in conjunction with FIG. 3.

The coolant pumps 216 may be operated, such as by the BTMS controller 128, to pump a sufficient amount of coolant through each of the BTMS modules 202. Although depicted as each BTMS module 202 having its own coolant pump 216, it should be appreciated that, alternatively, multiple BTMS modules 202 may share a coolant pump 216 or multiple coolant pumps 216 may pump coolant through a single BTMS module 202. Although shown here as being disposed upstream of the BTMS modules 202, the coolant pumps may, alternatively and/or additionally be disposed downstream of the BTMS modules 202 and/or even within the BTMS modules 202.

The BTMS controller 128 may be configured to control the coolant pumps 216 according to the cooling needs of the battery packs 208, 210 and/or the cooling levels of the respective BTMS modules 202. For example, the coolant pumps 216 may be operated to pump additional coolant, such as from the coolant tank 214, based at least in part on the cooling needs to the corresponding battery pack 208, 210. In some cases, there may be a certain level of coolant flow for each BTMS unit 204 that is operated in active mode. In other words, the BTMS controller 128 may instruct the coolant pump 216 to increase coolant flow by a certain quantum for each BTMS unit 204 of the BTMS module 202 that is active.

As shown in FIG. 2, it should be noted that each of the battery packs 208, 210 can be independently cooled, with its own dedicated BTMS module 202. This allows for better and more robust control of temperature for the different battery packs 208, 210 of the battery 118 than conventional cooling systems. Additionally, within a BTMS module 202 there are variable selectable levels of cooling possible by selecting the number of BTMS units 204 to operate actively within the BTMS module 202. By activating the BTMS units 204 of a BTMS module 202 according to the cooling needs of the corresponding battery pack 208, 210, the operating temperature of the battery 118 can be tightly controlled, resulting in a more reliable and more efficient operation of the battery 118 and greater longevity of the battery 118.

Figure 3:
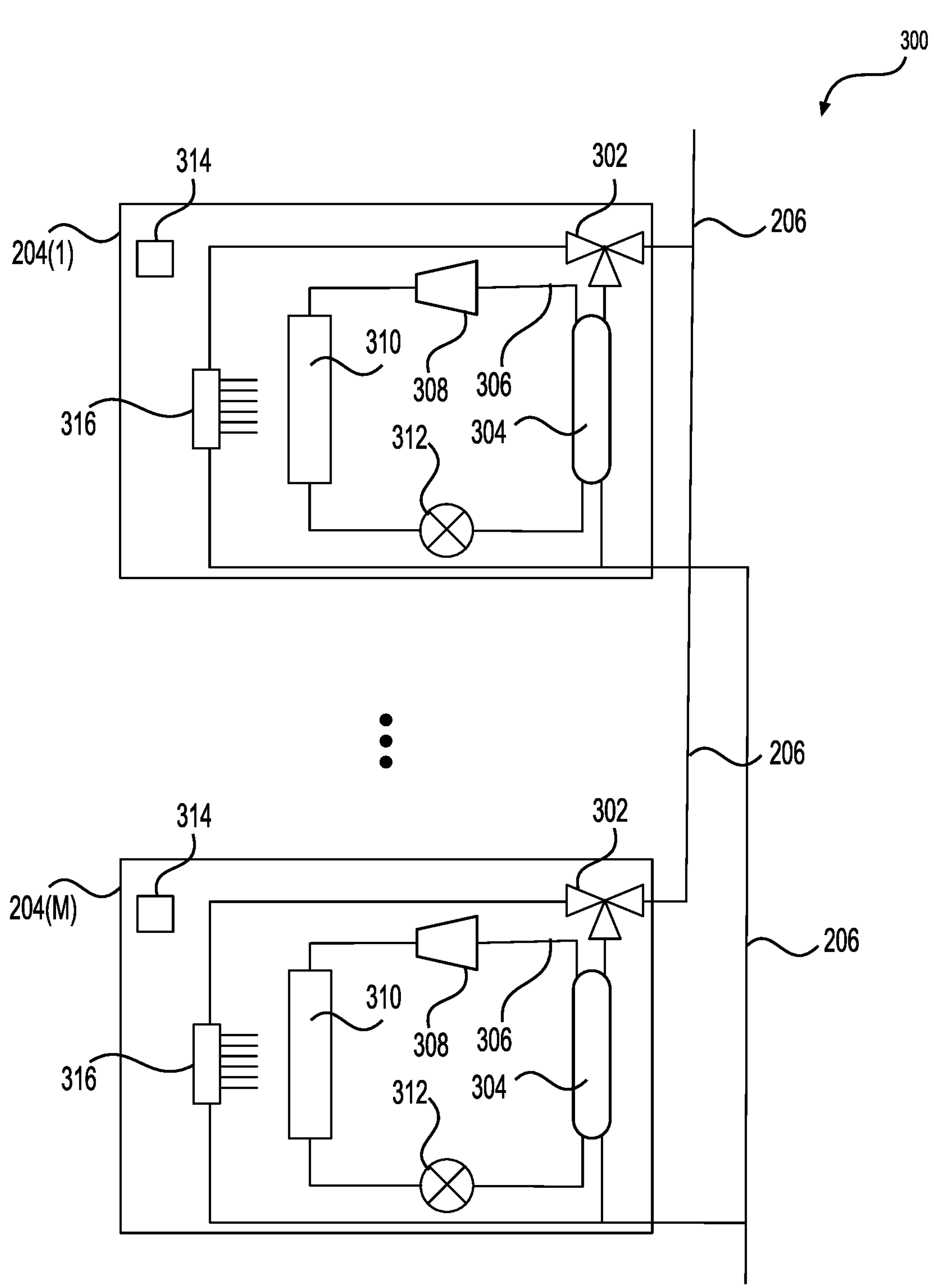
FIG. 3 is a schematic illustration depicting an environment with the battery thermal management system (BTMS) units within the BTMS of FIG. 2, according to examples of the disclosure.

FIG. 3 is a schematic illustration depicting an environment 300 with the battery thermal management system (BTMS) units 204 within the BTMS 126 of FIG. 2, according to examples of the disclosure. As shown, two specific BTMS units 204(1), 204(M) within a particular BTMS module 202 is depicted, along with example constituent components of the BTMS units 204(1), 204(M). Although two particular BTMS units 204(1), 204(M) are shown, there may be any number of BTMS units 204 within this BTMS module 202, as indicated by the ellipses between BTMS units 204(1), 204(M).

As discussed herein, the BTMS units 204 of a BTMS module 202 may be operated independently or in conjunction with the other BTMS units 204 of the BTMS module 202. Individual BTMS modules may be operated in either an active mode (e.g., with a refrigeration operation) or a passive mode (e.g., with flow through a radiative element). In some cases, all of the BTMS units 204 within a particular BTMS module 202 may be substantially identical, such as with a similar or same model number, manufacturer, type, capacity, combinations thereof, or the like. In other cases, different BTMS units 204, such as different type and/or model, may be provided within a BTMS module 202.

The BTMS units 204 may be of any suitable type that can provide cooling of a fluidic coolant within the coolant lines 206. For example, the BTMS units 204 may be or include any suitable refrigeration system, such as any proprietary refrigeration system and/or any suitable commercially available refrigeration system.

The coolant flow within each of the BTMS units 204 may be controlled by one or more valves 302. For example, as shown, valve 302 may be disposed such that the coolant may selectively flow into a chiller 304. The BTMS unit 204 my further include a refrigerant line 306, a compressor 308, a condenser 310, an expansion valve 312, a BTMS unit controller 314, and a radiator 316. Refrigerant may flow through the refrigerant line 306, as well as the chiller 304, the compressor 308, the condenser 310, and the expansion valve 312 when the BTMS unit 204 is operated in an active mode. When the BTMS unit 204 is operated in a passive mode, the refrigerant may not flow through the aforementioned elements. Rather, in passive mode, coolant may be flowed through the radiator 316. It should be understood that although a particular refrigeration unit is discussed with respect to the BTMS units 204, the disclosure herein contemplates using any suitable type or refrigeration system for the BTMS units 204.

The valve 302, such as in the form of a three-way valve, in some examples, may be controlled by the BTMS controller 128 or any other suitable control system. In alternate examples, the BTMS unit controller 314 may control the valves 302 to allow coolant to flow into either the chiller 304, when that unit is in active mode, or the radiator 316, when that unit is in passive mode. In other cases, other controllers may control the valve 302 and, thereby, the flow of coolant within individual ones of the BTMS units 204. Regardless of which entity controls the valve 302, coolant may be allowed to flow within a particular BTMS unit 204 through the chiller 304 for a predetermined period of time after that BTMS unit 204 is to be operated in passive mode. For example, coolant may flow through the chiller 304 even after the refrigerant is not compressed in the compressor 308, if the refrigerant is still cool and can extract thermal energy from the coolant in the coolant lines 206.

Although the valve 302 is depicted as a three-way valve, where the valve 302 can direct coolant flow in one of two directions, it should be understood that valve 302 may be implemented in any variety of suitable ways. For example, other types of valve(s) may be used. Further still, the operation of valve 302 may be accomplished by more than one valve disposed within, or even outside of, the BTMS unit 204.

The refrigerant, as flows through refrigerant line 306 may be of any suitable type, such as R-410A, R-407C, R-134a, R22, freon, any variety of hydrofluorocarbons, any variety of chlorofluorocarbons, or indeed any compressible gas or liquid. The BTMS units 204, when turned on or in active mode, may operate similarly as commercial refrigeration systems, where the refrigerant is compressed by the compressor 308, undergoes state change in the condenser 310, and flow regulated by the expansion valve 312. At the chiller 304, which may also be referred to as an evaporator, thermal energy from the coolant is transferred, in part, to the refrigerant. In other words, the coolant is cooled down at the chiller 304. The coolant may include any suitable fluid, such as water, glycol, oil, surfactant, air, combinations thereof, or the like. The BTMS unit controller 314 for each of the BTMS units 204 may control its own BTMS unit 204, and optionally the valves 302. In other words, the BTMS unit controller 314, based at least in part on instructions received from the BTMS controller 128, may control the operations of the chiller 304, the compressor 308, the condenser 310, the expansion valve 312, and/or any other elements of its BTMS unit 204.

According to examples of the disclosure, the BTMS controller 128 is configured to selectively turn on and turn off (e.g., operate in an active mode or a passive mode) individual BTMS units 204 within a BTMS module 202. The BTMS controller 128 may also track the active use time of each of the BTMS units 204 within each of the BTMS modules 202. The BTMS controller 128 may still further keep track of the last time when any BTMS unit 204 under its control was operated actively. The BTMS controller 128 may be configured to use data, such as temperature data from the battery 118 and/or its constituent packs 208, 210, along with usage data of each of the individual BTMS units 204 to determine which, if any of the BTMS units are to be operated in active mode to regulate the temperature of the battery 118 and/or its constituent battery packs 208, 210.

When the BTMS unit 204 is operated in a passive mode, the coolant may be flowed through radiator 316, such as by controlling the valve 302. Whe operating in the passive mode, the active, energy consuming portions of the BTMS unit 204 (e.g., compressor 308, condenser 310, etc.) do not need to be operated. Rather the coolant may shed thermal energy in the radiator 316. When the temperature of the battery 118 and/or battery packs 208, 210 are within a desired range, the BTMS units 204 of the corresponding BTMS module 202 may be operated in the passive mode.

It should be appreciated that by independently controlling individual BTMS units 204 within a BTMS module 202, the BTMS controller 128 is able to control the level of cooling. Cooling, as used herein refers to one or both of extracting thermal energy from an element being cooled, such as the battery 118, its constituent battery packs 208, 210, power electronics, hydraulic systems, or the like, or to reducing the temperature of the element being cooled. Thus, depending on the cooling needs of the battery 118 or power electronics of the electric machine 100, the BTMS 126 can be operated in a manner to provide the appropriate level of cooling to the appropriate components of the electric machine 100. As a result, the BTMS 126 can be operated in a modular way to dynamically respond to the cooling needs of components, such as the battery 118, of the electric machine 100.

Figure 4:
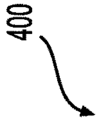
FIG. 4 is a schematic illustration depicting an environment with a control system of the battery thermal management system (BTMS) of FIG. 2, according to examples of the disclosure.
Figure 4:
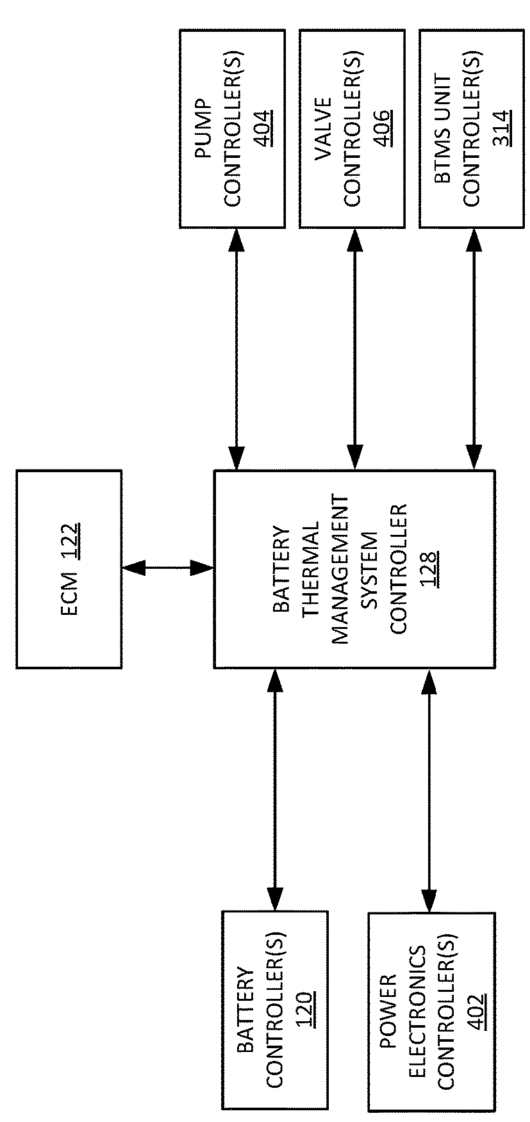
Figure 4:

FIG. 4 is a schematic illustration depicting an environment 400 with a control system of the battery thermal management system (BTMS) of FIG. 2, according to examples of the disclosure. As discussed herein, the BTMS controller 128 may receive a variety of signals that it processes to enable that the BTMS 126 to operate in a manner to keep the temperature of the battery 118 and/or individual battery packs 208, 210 within a controlled range of temperatures.

As discussed herein, the BTMS controller 128 may receive signals from the battery controller 120 that indicates parameters, such as the temperature of the battery 118 and/or individual battery packs 208, 210 of the battery 118. As discussed herein, in some cases, the only one battery controller 120 may report parameters of the battery 118 or even more than one battery to the BTMS controller 128. In other cases, there may be multiple battery controllers 120, such as a dedicated battery controller 120 for each of the battery packs 208, 210, that report battery 118 related or battery pack 208battery pack 208, 210 related parameters to the BTMS controller 128. The parameters that are reported may be any suitable battery 118 or battery pack 208battery pack 208, 210 related parameters, such as temperatures of individual cells of the battery 118 and/or battery packs 208, 210, high and/or low temperatures of cells of the battery 118 and/or battery packs 208, 210, other statistics (e.g., mean median, standard deviation, etc.) of temperatures of cells of the battery 118 and/or battery packs 208, 210, or the like. The battery controller 120, or any other suitable controller, may also be configured, in some cases, to determine and report to the BTMS controller 128 one or more parameters of the coolant used to cool the battery 118 and/or its battery packs 208, 210, such as inlet pressure, outlet pressure, inlet temperature, outlet temperature, etc.

The BTMS controller 128 may further be configured to receive signals from a power electronics controller 402 providing parameters associated with power electronics of the electric machine 100. As discussed herein, the BTMS 126 may also be used to cool power electronics, or indeed any other component of the electric machine 100 to is to be operated within a controlled temperature range. Similar to the battery controller 120, the power electronics controller 402 may provide any variety of information to the BTMS controller 128, such as temperature(s) or statistical aggregations thereof of the power electronics and/or any variety of temperature and/or pressure data associated with the coolant used to cool the power electronics.

The BTMS controller 128 may still further be configured to receive ambient condition (e.g., ambient temperature, ambient pressure, etc.) information from the ECM 122 or other controller. This ambient information may also, in some examples, be used to determine whether individual BTMS units 204 of a particular BTMS module 202 are to be operated in an active or passive mode.

The BTMS controller 128 may receive information (e.g., parametric data) from one or both of the battery controllers 120 and/or the power electronics controllers 402 and determine if a BTMS unit 204 in one or more BTMS modules 202 are to be operated in an active mode. In some cases, the determination of whether a BTMS unit 204 is to be operated in an active mode may be determined based at least in part on ambient conditions, as received by the BTMS controller 128 from the ECM 122 or other controller. As discussed in conjunction with FIG. 3, in some cases, individual BTMS modules 202 may correspond to respective individual battery packs 208, 210. Thus, if a particular battery pack 208, 210 is to be cooled due to high temperature of that battery pack 208, 210, as determined from signal(s) received from the battery controller(s) 120, then the BTMS controller 128 may cause at least one BTMS unit 204 within the corresponding BTMS module 202 to be actively operated. It will be appreciated that the BTMS controller 128 may command the active operation of a single BTMS module 202, some BTMS modules 202, or all of the BTMS modules 202 available on the electric machine 100 depending on the cooling needs of the battery 118 and/or other components of the electric machine 100.

When it is determined, by the BTMS controller 128, that a particular BTMS module 202 is to be actively operated, the BTMS controller 128 may further determine how many and/or which of the constituent BTMS units 204 are to be actively operated within that BTMS module 202. It should be understood that the BTMS controller 128 may make this determination concurrently, or in an interleaved manner, for all of the BTMS modules 202 that are to be operated on the electric machine 100. Based at least in part on the determination of which BTMS units 204 within each of the BTMS modules 202 are to be actively operated, the BTMS controller 128 may generate and send commands to various controllers of the electric machine 100. For example, the BTMS controller 128 may determine command(s) to operate the pumps 216 and send those pump command(s) to one or more pump controller(s) 404 configured to operate the pumps 216. Similarly, the BTMS controller 128 may determine command(s) to operate the valve(s) 302 and send those valve command(s) to one or more valve controller(s) 406 configured to operate the valve(s) 302. Furthermore, the BTMS controller 128 may determine command(s) to control individual BTMS unit(s) 204 and send those BTMS unit command(s) to the corresponding BTMS unit controller(s) 314. It should be understood that there may be other components and/or other controllers that may be instructed by the BTMS controller 128 in operating the BTMS 126 in the dynamic and modular mechanism, as disclosed herein.

In some implementations, the BTMS controller 128, as well any of the other controllers discussed herein, may include an electronic control module, a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, BTMS controller 128 may possess its own local memory, which also may store program modules, program data, and/or one or more operating systems. For example, the memory/storage may store battery thermal management control software to enable the methods disclosed herein. The BTMS controller 128 may include one or more cores.

In some instances, the communications between the BTMS controller 128 and the various other components and/or controllers of the electric machines 100 may be via any suitable protocol-based communications or any suitable non-protocol-based communications. In examples of the disclosure, the BTMS controller 128 may have wired communicative connections with the various components of the electric machine 100 with which it communicates. In other cases, the BTMS controller 128 may have wireless communicative connections (e.g., Bluetooth, WiFi, Direct WiFi, etc.) with the various components of the electric machine 100 with which it communicates. In yet other cases, the BTMS controller 128 may have a mix of wired and wireless communicative links with the various components of the electric machine 100 with which it communicates. Regardless of the exact nature of its communicative links, the BTMS controller 128 is configured to receive various information about the components (e.g., battery packs 208, 210) that it is to cool and determine based upon that information and any other data, which if any of the BTMS modules 202 and constituent BTMS units 204 to operate.

In further examples, the BTMS controller 128 is configured to track the usage of each of the BTMS units 204 in active mode. The BTMS controller 128 may determine which BTMS units 204 to actively operate within individual BTMS modules 202 based at least in part on the total active operating time of the various BTMS units 204. For example, when BTMS units 204 within a BTMS module 202 are to be actively operated, the BTMS controller 128 may cause those BTMS units 204 with the least active operating time to be actively operated. This may improve the overall longevity of the BTMS 126 and/or the constituent BTMS modules 202 and/or the BTMS units 204.

In some cases, the BTMS controller 128 is configured to track when each of the BTMS units 204 as disposed within any of the BTMS modules 202 of the BTMS 126 was last used in active mode. The BTMS controller 128, in some examples, may actively operate BTMS units 204 based at least in part on when a particular BTMS unit 204 was last operated in active mode. BTMS units 204 may have a latency period, during which it is not efficient, or otherwise desirable, to actively operate the BTMS unit 204. Therefore, in some cases, the BTMS controller 128, when an additional BTMS unit 204 is required to actively operate, may select a BTMS unit 204 that has not been operated in active mode recently. In other words, the BTMS controller 128 may not instruct the active operation of any BTMS units 204 that are within the latency period after its last active use. In some cases, the latency period may be a time period in the range of about 15 seconds to about 6 minutes. For example, in some cases, the latency period may be about 2 minutes from a BTMS unit's last active use. The preceding range is just an example, and it will be understood that the latency period of the BTMS units 204 may be of any suitable value.

It will be understood that the control mechanism, as depicted in the environment 400, may allow a modular and on-demand operation of the BTMS 126. Only BTMS modules 202 corresponding to elements that are to be cooled may be operated. Furthermore, only the BTMS units 204 within the operating BTMS module 202 are actively operated. In this way, cooling is provided only where it is needed and not for components that do not need to be cooled. Additionally, the cooling level is modulated according to cooling needs. This provides for better control of cooling needs in a robust and dynamic way.

Figure 5:
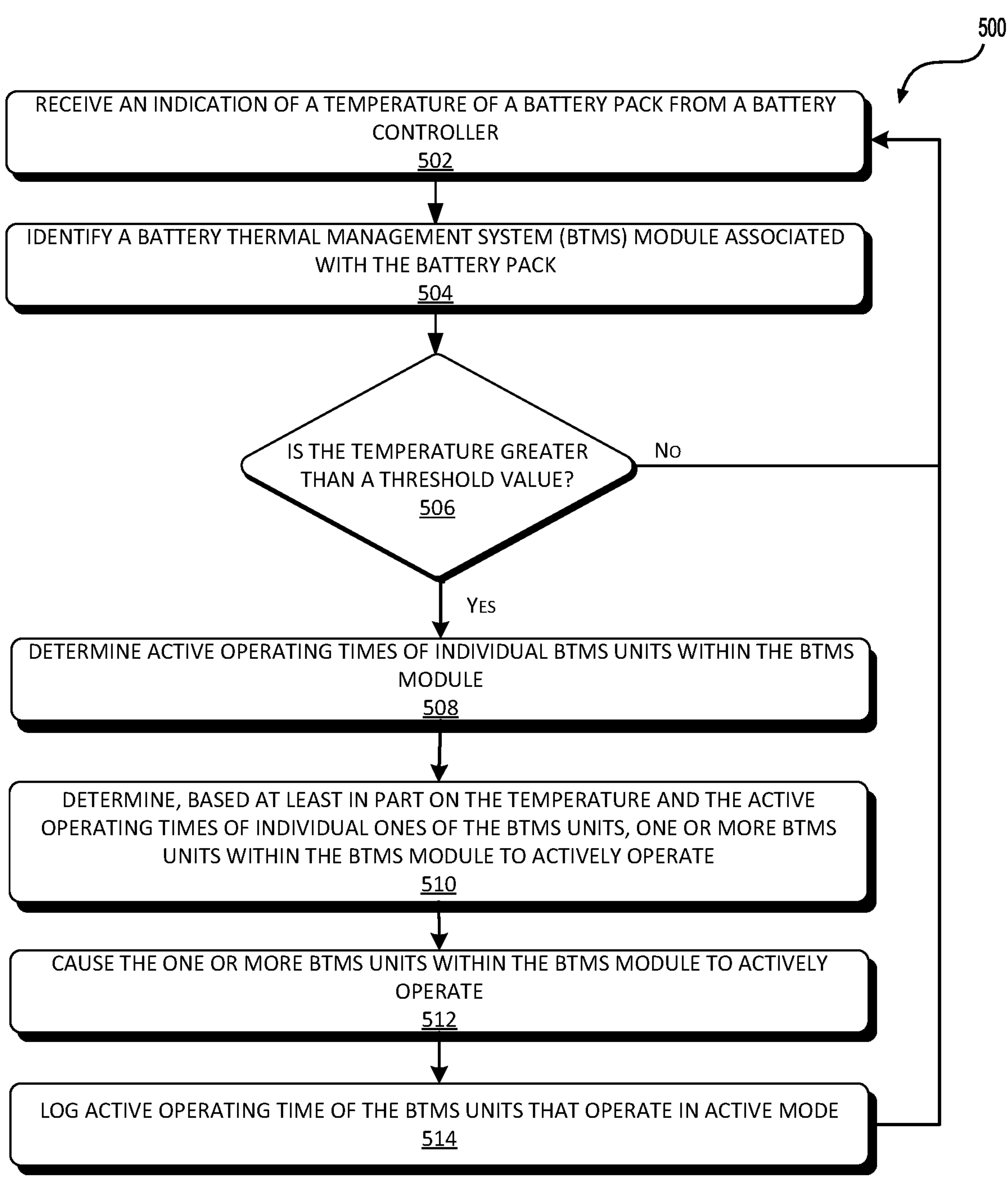
FIG. 5 is a flow diagram depicting an example method for controlling the battery thermal management system (BTMS) of FIG. 2, according to examples of the disclosure.

FIG. 5 is a flow diagram depicting an example method for controlling the battery thermal management system (BTMS) of FIG. 2, according to examples of the disclosure. The processes of method 500 may be performed by the BTMS controller 128 in cooperation with one or more elements of environment 400 of FIG. 4. Alternatively, method 500 may be performed by one or more other controllers of the electric machine 100.

At block 502, the BTMS controller 128 may receive an indication of a temperature of a battery pack 208, 210 from a battery controller 120. The indication of the temperature may be of any suitable kind. For example, in some cases, a temperature of a representative cell of the battery pack 208, 210 may be received. In other cases, an average, a median, a variance, a standard deviation, a minimum, a maximum, or indeed any suitable descriptive statistic of the temperature of a number of individual cells of the battery pack 208, 210 may be received by the BTMS controller 128. In yet other cases, instead of a temperature related to a cell of the battery pack 208, 210, the BTMS controller 128 may receive data associated with the temperature of the coolant flowing to and/or through the battery pack 208, 210. For example, in some cases, the inlet temperature and/or pressure to the heat exchanger 212 of the battery pack 208, 210, the outlet temperature and/or pressure from the heat exchanger 212, or both the inlet and outlet parameters may be received by the BTMS controller 128.

At block 504, the BTMS controller 128 identifies a BTMS module 202 associated with the battery pack 208, 210 for which the indication of the temperature was received. As disclosed herein, individual battery packs 208, 210, or indeed any individual element of the electric machine 100 that is to be cooled, may have a corresponding BTMS module 202 that can be modularly operated, independent of other BTMS modules 202 of the electric machine 100. For example, a particular BTMS module 202 may be operated when its corresponding element to be cooled (e.g., battery pack 208, 210, power electronics, etc.) are to be cooled. Thus, when a particular temperature level is received and/or determined by the BTMS controller 128, the BTMS controller 128 may identify the corresponding BTMS module 202 for that battery pack 208, 210.

At block 506, the BTMS controller 128 may determine if the temperature indicated for the battery pack 208, 210 is greater than a corresponding threshold value. If the temperature is not greater than the corresponding threshold value, then the method 500 may return to block 502 where the BTMS controller 128 may continue to receive the indication of the temperature of the battery pack 208, 210. In some cases, the threshold value may be the upper range of temperatures to which the battery pack 208, 210 is to be controlled. For example, if a particular battery pack is to be within a range of 10° C. and 20° C., then the threshold value may be set at the upper end of that range, or 20° C. In other cases, the threshold value may be set at the midpoint of the range of allowable temperatures. In this case, with reference to the prior control range, the threshold value may be set to 15° C. In yet other cases, the threshold level may be set to a small amount under the top of the range. Again, with reference to the prior example range of temperatures, the threshold level may be set at 18° C. The range (10° C. to 20° C.) is merely an example, and the control range for the temperature of the battery packs 208, 210 may be any suitable range. In some cases, the control range for the temperature of the battery may be about 10° C. to about 40° C. In other cases, the control range for the temperatures may be in the range of about 15° C. to about 30° C. In yet other examples, the control range of temperatures may be in the range of about 10° C. to 25° C.

If at block 506, the BTMS controller 128 determines that the temperature associated with battery pack 208, 210, as received as part of the process of block 502, is greater than the corresponding threshold value, then the BTMS controller 128 may determine, at block 508, the active operating times of individual BTMS units 204 within the BTMS module 202. The BTMS controller 128 may store and update, locally or in an accessible datastore, the active usage time for each of the BTMS units 204. The purpose of tracking the BTMS unit 204 active usage times may be to evenly distribute the usage of the BTMS units 204 within the BTMS module 202 to maximize the time between maintenance and/or to reduce the probability of downtime of the BTMS module 202 due to overuse and failure of a particular BTMS unit 204 of the BTMS module 202.

At block 510, the BTMS controller 128 may determine, based at least in part on the temperature and the operating times of the individual ones of the BTMS units 204, one or more BTMS units 204 within the BTMS module 202 to operate in active mode. In some cases, the total number of BTMS units 204 that are to be actively operated may be determined based on the how high the temperature, as received by the processes of block 502, are compared to the range of desired temperatures for the battery pack 208, 210. In some cases, the BTMS controller 128 may compare the temperature associated with the battery pack 208, 210 to multiple threshold levels to determine how many BTMS units 204 within the BTMS module 202 are to be actively operated. With respect to which of the BTMS units 204 to actively operate, the BTMS controller 128 may track the overall active usage of each of the individual BTMS units 204 and operate in active mode in the preference of the BTMS units 204 with the lowest active operating times. In other words, the BTMS controller 128 may identify how many BTMS units 204 to actively operate based at least in part on the cooling need of the battery pack 208, 210 and then actively operate those BTMS units 204 of the BTMS module 202 that have accumulated the least active operating time. In some cases, the determination of how many and/or which one s of the BTMS units 204 to operate in an active mode may consider ambient conditions (e.g., ambient temperature). For example, if the ambient temperature is below the desired operating range of the battery packs 208, 210 and the battery packs 208, 210 are to be cooled, then passive mode may be used, rather than active mode to cool the battery packs 208, 210.

At block 512, the BTMS controller 128 may cause the one or more BTMS units 204 within the BTMS module 202 to operate in an active mode. Causing BTMS units 204 to actively operate may entail coordinating various functions of various components. For example, the BTMS controller 128 may instruct the operation of BTMS units 204 to their corresponding BTMS unit controller(s) 314. Additionally, the BTMS controller 128 may control the valves 302 in a manner to enable the flow of coolant in an active path (e.g., throught the chiller 304), rather than a passive path (e.g., through the radiator 316). In some cases, the valve 302 may be controlled by the BTMS unit controller 314, rather than the BTMS controller 128. Still further, the BTMS controller 128 may control the pump speed of the pump(s) 216 corresponding to the BTMS module(s) 202 that are to be operated. In some cases, the pump speed, or velocity, of the pumps 216 may be determined based at least in part on the cooling needs of the corresponding battery packs 208, 210. In some cases, the pump speed control is a function of the coolant temperature and/or battery 118 temperatures. There may be an interlock to make sure the actual pump speed is sufficient to run the BTMS unit(s) 204.

As discussed herein, there may be provided a single pump 216 for each BTMS module 202 in some cases, and in other cases, there may be provided more than one pump 216 for each of the BTMS modules 202. In yet other cases two or more BTMS modules 202 may share a single pump 216. In some cases, the pump 216 may be upstream of its corresponding BTMS module 202. In other cases, the pump 216 may be downstream of its corresponding BTMS module 202. In all of these cases, pumping of coolant within the coolant line 206 provides for the coolant to pass through the respective BTMS module 202 and its constituent BTMS units 204. Regardless of the pump 216 to BTMS module 202 configuration, the pump(s) 216 may be controlled, such as by the BTMS controller 128 in conjunction with a local controller, to pump the appropriate amounts of coolant through the coolant lines 206 to the BTMS modules 202. In some cases, the pump(s) 216 may be configured to pump coolant that is stored in the coolant tank 214, which may serve as a coolant reservoir or sump tank.

At block 514, the BTMS controller 128 may log the active operating time of each of the BTMS units 204. In other words, the active operating time of the BTMS units 204 that were actively operated as part of the processes of blocks 510 and 512 are to have their active operating times incremented in a log of the operating time of all the BTMS units 204 of the BTMS 126. The log of BTMS unit 204 active operating times may be used in the future to determine which ones of the BTMS units 204 to select for active operation, such as in the processes of block 510. Additionally, the usage logs for the BTMS units 204 may be used to identify when maintenance and/or replacement of BTMS units 204 may be needed.

The method 500 may return to block 502 to sequentially continue to monitor the temperature of the battery pack 208battery pack 208, 210. The method may repeat at a fixed frequency and/or whenever all of the processes of method 500 are fully performed. It should also be understood that the method 500 may be performed for each of the components that are to be cooled on the electric machine 100. In some cases, each of the components to be cooled on the electric machine (e.g., other battery packs 208, 210, power electronics, etc.) may have their own corresponding BTMS module 202 to be operated according to the method 500.

It should also be understood that in some cases, the battery pack 208, 210 may need to be heated when it is too cold (i.e., below a preferred operating temperature range). In some examples, the BTMS 126 may include one or more heating apparatus, such as resistive coil(s) (not shown) and/or operating the BTMS unit(s) 204 in reverse for heating the coolant flowing in the coolant lines 206. The BTMS controller 128 may operate the resistive coil(s) in a manner such that the temperature of the battery pack 208battery pack 208, 210 is controlled within a preferred range.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

It will be appreciated that the processes of method 500 enable the operation of the BTMS 126 as disclosed herein on the electric machine 100. This BTMS 126 can be operated in a modular way to provide an appropriate on-demand level of cooling. Thus, the cooling needs of components, such as battery pack 208, 210 of the electric machine 100 can be met in a dynamic and on-demand way. The BTMS 126, as disclosed herein, results in battery longevity and/or greater battery efficiency due to better delivery of battery 118 thermal management needs, and therefore, reduced cost of operating the electric machine 100.

Figure 6:
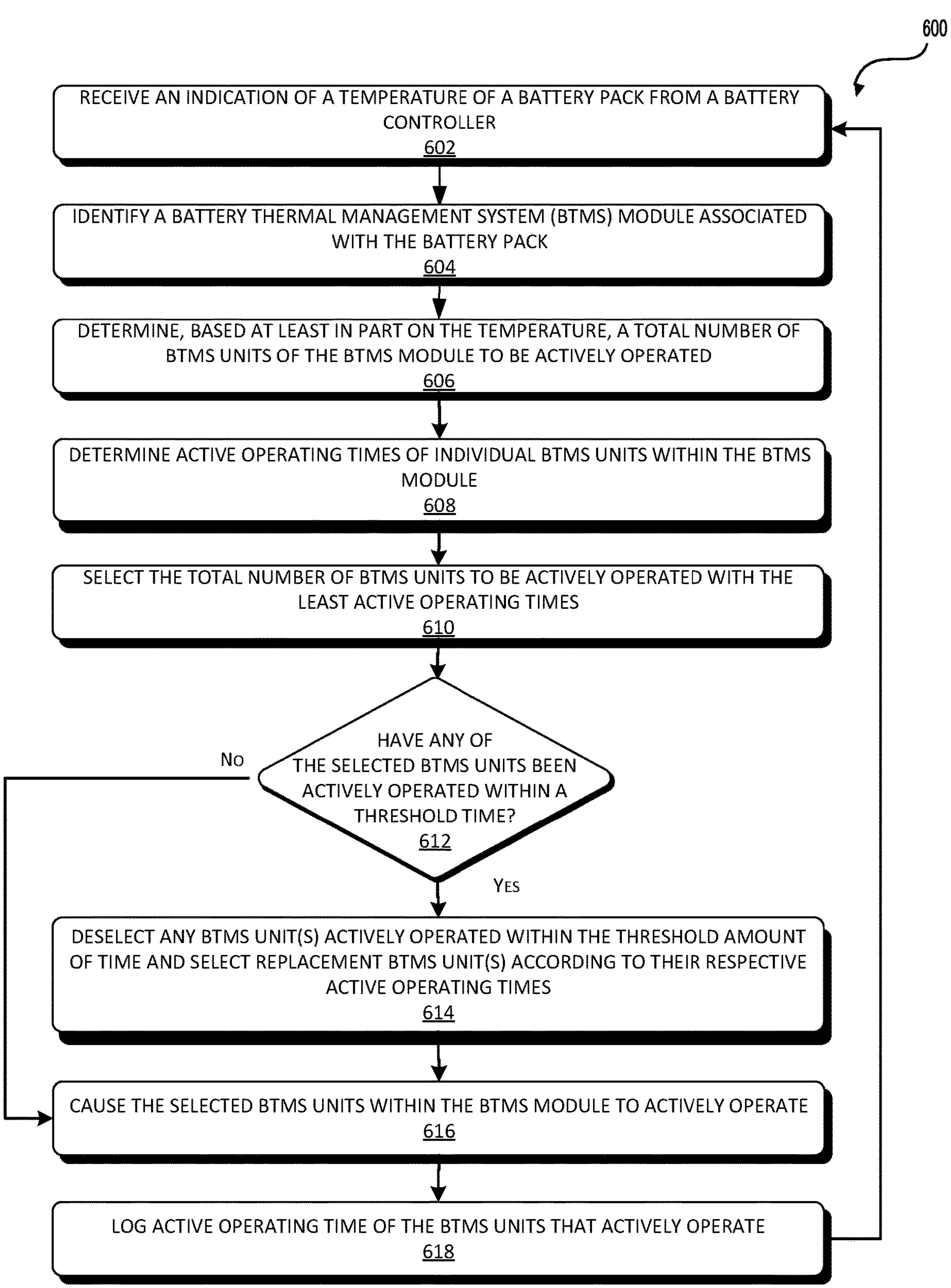
FIG. 6 is a flow diagram depicting another example method for operating the battery thermal management system (BTMS) of FIG. 2, according to examples of the disclosure.

FIG. 6 is a flow diagram depicting another example method 600 for operating the battery thermal management system (BTMS) of FIG. 2, according to examples of the disclosure. The processes of method 600 may be performed by the BTMS controller 128, individually or in conjunction with one or more other components of electric machine 100. It should also be noted that the processes of method 600 may be performed when the electric machine 100 is operating (e.g., performing tasks), charging, idling, turned off, or any combination thereof. The method 600 may be similar to method 500 of FIG. 5, but further take into account a latency time during which a BTMS unit 204 may not be used after when that BTMS unit 204 was last used.

At block 602, the BTMS controller 128 may receive an indication of a temperature of a battery pack 208, 210 from a battery controller 120. The indication of the temperature may be of any suitable kind. For example, in some cases, a temperature of a representative cell of the battery pack 208, 210 may be received. In other cases, an average, a median, a variance, a standard deviation, a minimum, a maximum, or indeed any suitable descriptive statistic of the temperature of a number of individual cells of the battery pack 208, 210 may be received by the BTMS controller 128. For example, in one case, the BTMS controller 128 may receive an indication of the maximum cell temperature and minimum cell temperature of the battery pack 208, 210, such as from the battery controller 120. In yet other cases, other parameters may be received, such as inlet and/or outlet temperature(s) and/or pressure(s) of the coolant arriving at and/or leaving the heat exchanger 212 of the battery pack 208, 210.

At block 604, the BTMS controller 128 identifies a BTMS module 202 associated with the battery pack 208, 210 for which the indication of the temperature was received. As disclosed herein, individual battery packs 208, 210, or indeed any individual element of the electric machine 100 that is to be cooled, may have a corresponding BTMS module 202 that can be modularly operated, independent of other BTMS modules 202 of the electric machine 100. Thus, when a particular temperature level is received and/or determined by the BTMS controller 128, the BTMS controller 128 may identify the corresponding BTMS module 202 for that battery pack 208, 210.

At block 606, the BTM controller 128 may determine the total number of BTMS units 204 of the BTMS module 202 to operate actively. This determination may be based at least in part on how much cooling is required for the battery pack 208, 210. For example, if a low amount of cooling is needed to bring the battery pack 208, 210 a desired temperature, then only one BTMS unit 204 may be operated in active mode. If somewhat more cooling is desired, two BTMS units 204 may be actively operated. If yet more cooling is desired, then additional BTMS units 204 may be actively operated. If high levels of cooling is required, then all of the BTMS units 204 of the BTMS module 202 may be actively operated. The number of BTMS units 204 to be operated may be determined, in some cases, by comparing the temperature value, as received by the processes of block 602, to multiple (e.g., tiered) threshold values. In this case, the number of thresholds satisfied may indicate the total number of BTMS units 204 of the BTMS module 202 to be operated. In some cases, the number of BTMS units 204 to be operated actively may further be determined based at least in part on ambient conditions (e.g., ambient air temperature, etc.). For example, if the ambient temperature is relatively low compared to the desire temperature range of the battery packs 208, 210, then passive cooling may be used to cool the battery packs 208, 210, rather than active cooling.

At block 608, the BTMS controller 128 may determine the active operating times of each of the BTMS units 204 within the BTMS module 202. With respect to which of the BTMS units 204 to actively operate, the BTMS controller 128 may track the overall active usage of each of the individual BTMS units 204 and actively operate in the preference of the BTMS units 204 with the lowest active operating times. In other words, the BTMS controller 128 may identify how many BTMS units 204 to actively operate based at least in part on the cooling need of the battery pack 208, 210 and then actively operate those BTMS units 204 of the BTMS module 202 that have accumulated the least active operating time.

At block 610, the BTMS controller 128 may select the total number of BTMS units 204 to be actively operated with the least active operating times. This selection of the BTMS units 204 may be progressive, in the order of least active operating times/usage, until the total number of BTMS units 204 needed, as determined at block 606, are selected. However, at this point it is not known if any of the selected BTMS units 204 are within a latency period (i.e., a threshold time period after its last use). BTMS units 204 that are actively operated within their latency time period may not operate properly and/or efficiently.

At block 612, the BTMS controller 128 may determine if any of the selected BTMS units 204 have been actively operated within a threshold time. In some cases, the BTMS units 204 may have a latency time after active operation when they cannot be actively operated efficiently, or otherwise in a desirable way. Thus, in these cases, the BTMS controller 128 may select, for active operation, BTMS units 204 that have not recently (e.g., within a threshold period of time) been actively operated. The BTMS controller 128 may have a log of active operating times of each of the BTMS units 204 under its control and may be able to determine from this log if any of the selected BTMS units 204 were actively operated within the threshold period of time, corresponding to the latency of the BTMS units. The latency, or the threshold period of time, may be any suitable value and may differ somewhat according to the details (e.g., make, model, year, capacity, etc.) of the corresponding BTMS unit 204. Example threshold periods of time have been discussed herein, and in the interest of brevity, will not be repeated here.

If at block 612, the BTMS controller 128 determines that none of the BTMS units 204 had been actively operated within a threshold time period, then at block 616, the BTMS controller 128 may cause the selected BTMS units 204 to be actively operated. On the other hand, if at block 612, the BTMS controller 128 determines that one or more BTM units 204 had been actively operated within a prior threshold time period, then the method 600 may proceed to block 614, where the BTMS controller 128 deselects any BTMS unit(s) 204 that were actively operated in a prior threshold period of time and select other BTMS units 204 that were not actively operated within the threshold period of time according to their respective active operating times. In other words, any selected BTMS unit 204 that is within its latency period after a prior active usage may be replaced with another BTMS unit 204 that has the least cumulative active usage/operating time of the BTMS units 204 that were not originally selected at block 610.

At block 616, the BTMS controller 128 may cause the one or more BTMS units 204 within the BTMS module 202 to actively operate. Causing BTMS units 204 to operate in active mode may entail coordinating various functions of various components. For example, the BTMS controller 128 may instruct the operation of BTMS units 204 to their corresponding BTMS unit controller(s) 314. Additionally, the BTMS controller 128 may control the valves 302 in a manner to enable the flow of coolant in to chiller 304 within the BTMS unit 204 to be actively operated. In other cases, the BTMS unit controller 31 may control the operation of its respective valve 302. Still further, the BTMS controller 128 may control the pump speed of the pump(s) 216 corresponding to the BTMS module(s) 202 that are to be operated.

At block 618, the BTMS controller 128 may log the active operating time of each of the BTMS units 204. In other words, the active operating time of the BTMS units 204 that were actively operated as part of the processes of blocks 510 and 512 are to have their active operating times incremented in a log of the active operating time of all the BTMS units 204 of the BTMS 126. The log of BTMS unit 204 active operating times may be used in the future to determine which ones of the BTMS units 204 to select for active operation, such as in the processes of block 510. Additionally, the active usage logs for the BTMS units 204 may be used to identify when maintenance and/or replacement of BTMS units 204 may be needed. In some cases, the log of active operating times of the BTMS units 204 may include the last time each of the BTMS units 204 were actively operated. This information can be used to determine whether any of the selected BTMS units, such as in the processes of block 612, were actively operated within a latency time of the BTMS units 204.

The method 600 may return to block 602 to sequentially continue to monitor the temperature of the battery pack 208, 210. The method 600 may repeat at a fixed frequency and/or whenever all of the processes of method 600 are fully performed. It should also be understood that the method 600 may be performed for each of the components that are to be cooled on the electric machine 100. In some cases, each of the components to be cooled on the electric machine (e.g., other battery packs 208, 210, power electronics, hydraulic components, etc.) may have their own corresponding BTMS module 202 to be operated according to the method 600.

It should also be understood that in some cases, the battery pack 208, 210 may need to be heated when it is too cold (i.e., below a preferred operating temperature range). In some examples, the BTMS 126 may include a heating apparatus, such as one or more resistive coil(s) (not shown) or operating the BTMS unit(s) 204 in reverse for heating the coolant flowing in the coolant lines 206. The BTMS controller 128 may operate the resistive coil(s) in a manner such that the temperature of the battery pack 208, 210 is controlled within a preferred range.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
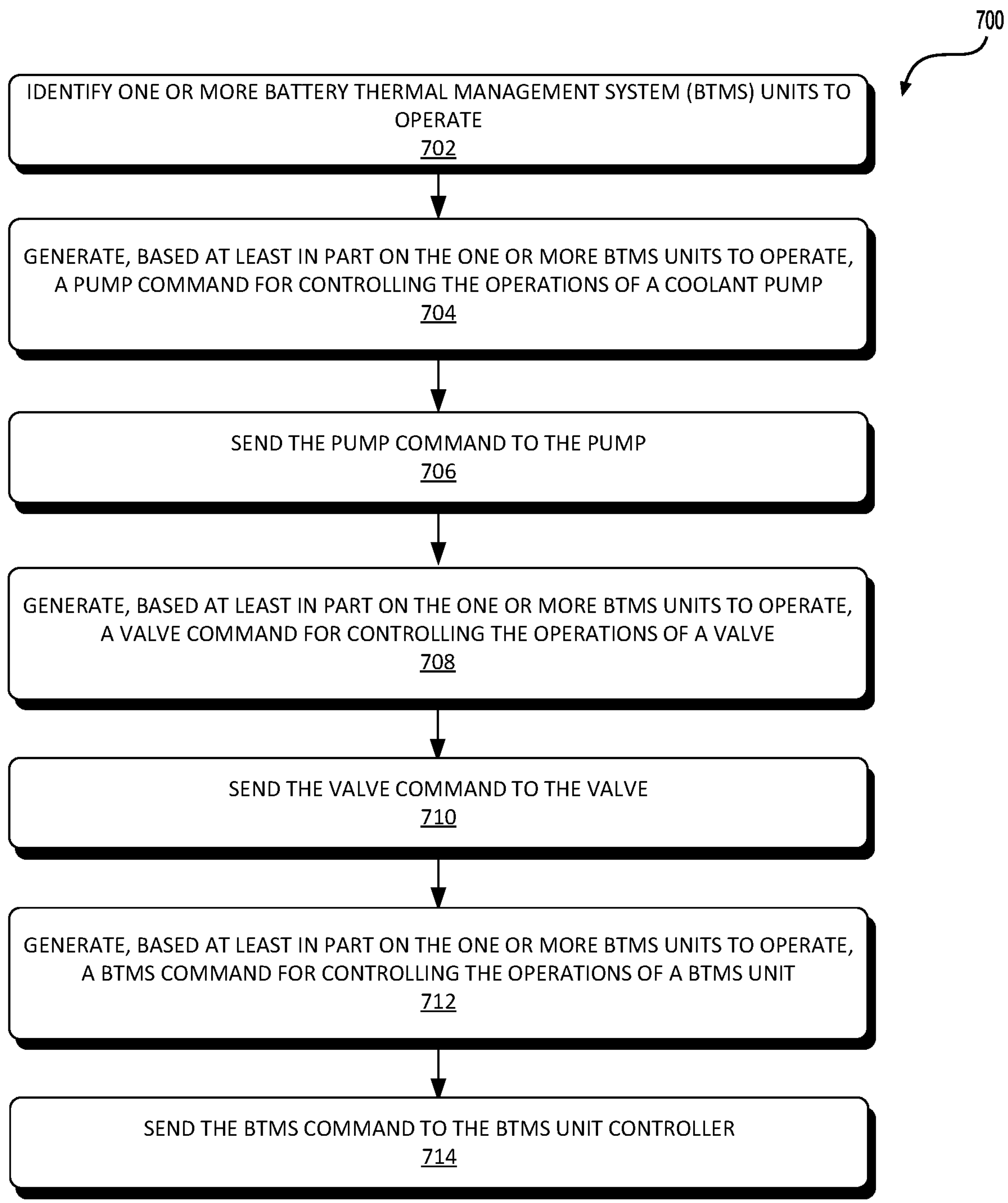
FIG. 7 is a flow diagram depicting an example method for causing one or more battery thermal management system (BTMS) units to operate, according to examples of the disclosure.

FIG. 7 is a flow diagram depicting an example method 700 for causing one or more battery thermal management system (BTMS) units to operate, according to examples of the disclosure. Method 700 may be an implementation for causing the BTMS units 204, as identified to be operated, to operate in methods 500 and 600, as depicted in FIGS. 5 and 6, respectively. Method 700 may be performed by the BTMS controller 128, or one or more alternate controllers, in cooperation with one or more other components of the electric machine 100.

At block 702, the BTMS controller 128 may identify one or more BTMS units 204 to operate. The process of identifying these BTMS units 204 is described in conjunction with methods 500 and 600 of FIGS. 5 and 6, respectively.

At block 704, the BTMS controller 128 may generate, based at least in part on the one or more BTMS units 204 to operate, a pump command for controlling the operations of the coolant pump 216. The pump command may indicate one or more parameters corresponding to how the pump 216 is to operate. For example, the pump command may be an encoded command that includes data fields that indicate pump speed, pump current, pump operating duration, and/or the like. In other cases, the pump command may be an analog signal that indicates one or more pump operating parameters. In some cases, there may be more than one pump 216 to operate, and in these cases, the BTMS controller 128 may generate multiple pump commands, each pump command corresponding to respective pump 216.

At block 706, the BTMS controller 128 may send the pump command to the pump 216. In some cases, the pump command may be a direct signal that may be used by the BTMS controller 128 to directly control the pump 216. In other cases, the pump command may include an encoded message that may be sent to the pump controller 404 of the pump 216 to operate the pump 216 according to parameters (e.g., pump speed) encoded in the pump command.

At block 708, the BTMS controller 128 may generate, based at least in part on the one or more BTMS units 204 to operate, a valve command for controlling the operations of one or more valves 302. The valve command may indicate one or more parameters corresponding to how the corresponding valve(s) 302 are to operate. For example, the valve command may be an encoded command that includes data fields that indicate whether the valve is to be open or closed, the level of flow therethrough, and/or the like. In other cases, the valve command may be an analog signal that indicates one or more valve operating parameters. In some cases, there may be more than one valve 302 to operate, and in these cases, the BTMS controller 128 may generate multiple valve commands, each valve command corresponding to a respective valve 302. As discussed herein, in some cases, the valve commands may be generated by the BTMS unit controller 314, rather than the BTMS controller 128.

At block 710, the BTMS controller 128 may send the valve command to the valve 302. In some cases, the valve command may be a direct signal that may be used by the BTMS controller 128 to directly control the valve 302. In other cases, the valve command may include an encoded message that may be sent to the valve controller 406 of the valve 302 to operate the valve 302 according to parameters (e.g., percent open) encoded in the valve command.

At block 712, the BTMS controller 128 may generate, based at least in part on the one or more BTMS units 204 to operate, a BTMS command for controlling the operations of the one or more BTMS units 204 that are to be operated. The BTMS command may indicate one or more parameters corresponding to how the corresponding BTMS units 204 are to operate. For example, the BTMS command may be an encoded command that includes data fields that indicate whether the BTMS is to be turned on or off, the level of cooling, and/or the like. In other cases, the BTMS command may be an analog signal that indicates one or more BTMS unit 204 operating parameters. In some cases, there may be more than one BTMS unit 204 to operate, and in these cases, the BTMS controller 128 may generate multiple BTMS commands, each BTMS command corresponding to a respective valve 302.

At block 714, the BTMS controller 128 may send the BTMS command to the BTMS unit 204. The valve command may include an encoded message that may be sent to the BTMS unit controller(s) 314 of the BTMS unit(s) 204 to operate the BTMS unit(s) 204 according to parameters (e.g., on/off) encoded in the BTMS command.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
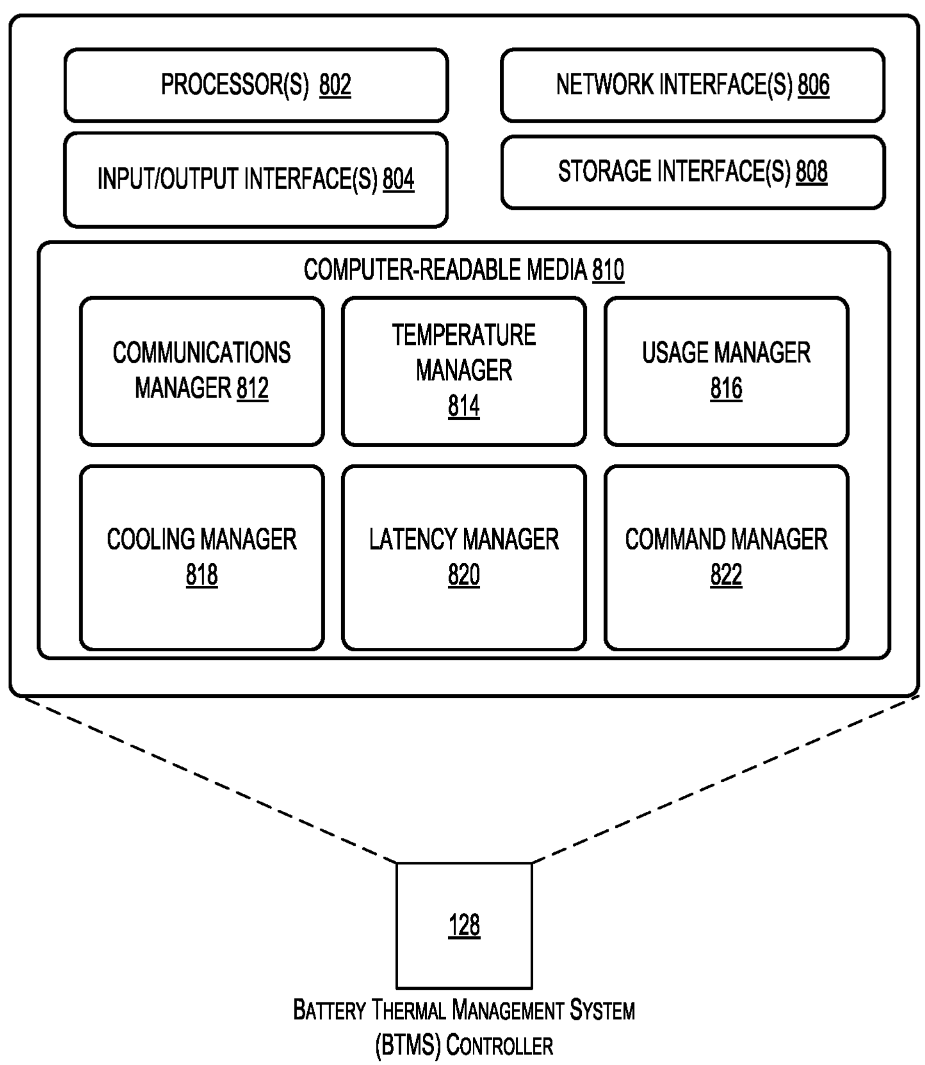
FIG. 8 is a block diagram of an example battery thermal management system (BTMS) controller of the BTMS of FIG. 2, according to examples of the disclosure.

FIG. 8 is a block diagram of an example battery thermal management system (BTMS) controller 128 of the BTMS of FIG. 2, according to examples of the disclosure. The BTMS controller 128 includes one or more processor(s) 802, one or more input/output (110) interface(s) 804, one or more network interface(s) 806, one or more storage interface(s) 808, and computer-readable media 810.

In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems. The one or more processor(s) 802 may include one or more cores.

The one or more input/output (I/O) interface(s) 804 may enable the BTMS controller 128 to detect interaction with an operator of the BTMS 126. For example, the operator may provide the BTMS controller 128 with desired operating conditions. Thus, the I/O interface(s) 804 may include and/or enable the BTMS controller 128 to receive and/or send information that is to be used to control the BTMS 126.

The network interface(s) 806 may enable the BTMS controller 128 to communicate via the one or more network (s). The network interface(s) 806 may include a combination of hardware, software, and/or firmware and may include software drivers for enabling any variety of protocol-based communications, and any variety of wireline and/or wireless ports/antennas. For example, the network interface(s) 806 may comprise one or more of WiFi, cellular radio, a wireless (e.g., IEEE 802.1x-based) interface, a Bluetooth® interface, and the like.

The storage interface(s) 808 may enable the processor(s) 802 to interface and exchange data with the computer-readable medium 810, as well as any storage device(s) external to the BTMS controller 128, such as any type of datastore that might be used to store, track, and/or retrieve BTMS unit usage data. The storage interface(s) 808 may further enable access to removable media.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 802 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 802. The computer-readable media 810 may have an operating system (OS) and/or a variety of suitable applications stored thereon. The OS, when executed by the processor(s) 802 may enable management of hardware and/or software resources of the BTMS controller 128.

Several components such as instruction, datastores, and so forth may be stored within the computer-readable media 810 and configured to execute on the processor(s) 802. The computer readable media 810 may have stored thereon an communications manager 812, a temperature manager 814, a usage manager 816, a cooling manager 818, a latency manager 820, and a command manager 822. It will be appreciated that each of the components 812, 814, 816, 818, 820, 822 may have instructions stored thereon that when executed by the processor(s) 802 may enable various functions pertaining to battery thermal management, as described herein.

The instructions stored in the communications manager 812, when executed by the processor(s) 802, may configure the BTMS controller 128 to communicate with a variety of components, including other controllers. The processor(s) 802 may be configured to communicate with the battery controller 120 to receive any variety of data associated with the battery 118 and/or the constituent battery packs 208, 210. For example, the processor(s) 802 may receive, from the battery controller 120, any variety of temperature data, such as cell temperatures, coolant temperature, high/low cell temperature, or the like pertaining to one or more battery packs 208, 210. The processor(s) 802 are further configured to send one or more messages, such as commands to control various components of the electric machine 100 to control the operation of the BTMS 126.

The instructions stored in the temperature manager 814, when executed by the processor(s) 802, may configure the BTMS controller 128 to manage a variety of functions related to thermal management, such as of a battery pack 208, 210. The processor(s) 802 may be able to identify a BTMS module 202 corresponding to a component (e.g., battery pack 208, 210, power electronics, etc.) that is to be cooled. The processor(s) 802 may also determine the number of BTMS units 204 and/or which ones of the BTMS units 204 to operate.

The instructions stored in the usage manager 816, when executed by the processor(s) 802, may configure the BTMS controller 128 to log, track, and/or report the active usage of each of the BTMS units 204. The processor(s) 802, may use the active usage log to balance the cumulative active operation time of individual BTMS units 204. The active usage data of the BTMS units 204 may be stored locally on the computer readable media 810 or on any suitable external datastore. The processor(s) 802 may further store the times when individual BTMS units 204 were actively operated. This time data in the active usage log can be used by the BTMS controller 128 to determine if a particular BTMS unit 204 is within its latency period since its last use.

The instructions stored in the cooling manager 818, when executed by the processor(s) 802, may configure the BTMS controller 128 to determine, based at least in part on temperature data associated with a battery pack 208, 210, the number of and/or which ones of the BTMS units 204 of a BTMS module 202 to operate. The processor(s) 802 may be configured to compare temperature data, such as high and low cell temperatures received from the battery controller 120, to one or more threshold levels to identify how many BTMS units 204. The processor(s) 802 may also be configured to identify which BTMS module 202 to actively operate to cool a particular component, such as battery pack 208, 210 of the electric machine 100.

The instructions stored in the latency manager 820, when executed by the processor(s) 802, may configure the BTMS controller 128 to determine whether the BTMS units 204 that are to be actively operated are not in a latency period following the last time those BTMS units 204 were actively operated. The BTMS units 204 may be characterized by a period of time between active uses (e.g., period of off time in an on-off-on sequence) when the BTMS units cannot or should not be used in an active mode. The usage of the BTMS units 204 during this latency period may result in no or reduced cooling ability of the BTMS unit 204, inefficiency in cooling by the BTMS unit 204, and/or damage to the BTMS unit 204. Thus, the active operations as described in conjunction with FIG. 6, enabled by the processor(s) 802, prevent BTMS units 204 to actively operate within a threshold period of time after their last active use, where their threshold period of time corresponds to the latency period. The latency period may range anywhere from about 15 seconds to about 5 minutes. In some cases, the latency period may be between about 30 seconds and about 4 minutes. In other cases, the latency period may be between about 1 minute and about 3 minutes. A non-limiting example latency period for a BTMS unit 204 may be approximately 2 minutes.

The instructions stored in the command manager 822, when executed by the processor(s) 802, may configure the BTMS controller 128 to generate and send commands to a variety of other components, such as other controllers, of the electric machine 100. For example, based at least in part on a determination of which BTMS modules 202 and their constituent BTMS units 204 to operate, the processor(s) 802 may generate and provide instructions to the valve(s) 302, the pump(s) 216, the BTMS unit controllers 314, or indeed any other suitable component of the electric machine 100.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other cases, the databases shown can be integrated or distributed into any number of databases or other data storage devices.

INDUSTRIAL APPLICABILITY

The present disclosure describes systems and methods for improved, modular, and on-demand cooling of components of electric machines 100, such as a battery 118, battery packs 208, 210 thereof, hydraulic components, and/or power electronics. These electric machines 100 provide several advantages, such as reduced carbon, particulate, and/or VOC emissions, as well as high torque at low rotations per minute (RPMs). However, the electric machines 100 use batteries 118 that require temperature control. In some cases, batteries 118 used in electric machines 100 can be expensive and, therefore, it is desirable to maximize the operational lifetimes and/or the efficiency of these batteries by carefully controlling their operating conditions, including operating temperatures. Thus, the technologies disclosed herein enable the mass use of more environmentally friendly and mechanically advantageous electric machines 100, while reducing the cost of ownership and cost of use of such electric machines 100 by maximizing the operating lifetimes of the batteries 118 of the electric machines 100.

The battery thermal management system (BTMS) 126, as disclosed herein, can be used in a modular manner with a variable level of cooling intensity. Furthermore, the cooling intensity can be increased or decreased in a dynamic and on-demand way. As a result, temperatures of batteries 118 or other components of the electric machine 100 can be continuously monitored and controlled in a robust manner. Thus, the battery packs 208, 210 may be controlled for temperature within a tighter range and with no or fewer excursion outside of that tighter range than was possible with previous thermal techniques. Additionally, electric machines 100 may have a more dynamic power draw from batteries than other applications such as electric cars. The BTMS 126, as disclosed herein, enables the regulation of temperature of the battery packs 208, 210 even with the greater demands of electric machines 100 relative to other applications of electric batteries 118. As a result, the technologies and techniques discussed herein enable the electrification of a wider range of electric work and mobility solutions.

The BTMS 126 itself is an improved design over previous thermal systems because the BTMS 126 provides a variable level of cooling in a manner where subcomponents such as each of the BTMS modules 202 and/or the BTMS units 204 are not overtaxed. By operating the BTMS units 204 only when needed, the BTMS 126 disclosed herein may have a longer operating lifetime than other thermal solutions. Additionally, by controlling the operation of the BTMS units 204 in a manner where operating times are leveled and where BTMS units 204 are idled during a latency period between use, the overall BTMS 126 may have a relatively high level of operation between maintenance.

Although the systems and methods of electric machines 100 are discussed in the context of a mining trucks and other mining machinery, it should be appreciated that the systems and methods discussed herein may be applied to a wide array of machines and vehicles across a wide variety of industries, such as construction, mining, farming, transportation, military, combinations thereof, or the like. For example, the BTMS 126 and temperature control mechanism disclosed herein may be applied to a compactor in the paving industry or a harvester in the farming industry. Further still, the BTMS 126 and temperature control mechanism disclosed herein may be applied to any variety of stationary applications, such as bidirectional power grids and/or stationary energy storage infrastructure.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A machine, comprising:
a motor to propel the machine;
a battery configured to power the motor;
a battery controller configured to report a temperature associated with the battery; and
a battery thermal management system (BTMS) including:
a first BTMS unit;
a second BTMS unit, wherein the first BTMS unit and the second BTMS unit are independently operable; and
a BTMS controller configured to:
receive a temperature level associated with the battery;
identify a first active operating time associated with the first BTMS unit;
identify a second active operating time associated with the second BTMS unit;
determine that the second active operating time is greater than the first active operating time;
determine, based at least in part on the temperature level and on the second active operating time being greater than the first active operating time, that the first BTMS unit is to be actively operated; and
cause the first BTMS unit to actively operate.

2. The machine of claim 1, wherein the BTMS controller is further configured to:
determine that the second BTMS unit is to operate passively, wherein the second BTMS unit includes a radiator through which coolant is flowed.

3. The machine of claim 1, wherein the BTMS controller is further configured to:
identify an amount of time that the first BTMS unit is actively operated; and
increment the first active operating time by the amount of time that the first BTMS unit is actively operated.

4. The machine of claim 1, wherein the BTMS controller is further configured to:
determine a last time when the first BTMS unit was actively operated; and
determine, based at least in part on the last time when the first BTMS unit was actively operated, that a threshold amount of time has passed since the last time when the first BTMS unit was actively operated, wherein determining that the first BTMS unit is to be actively operated is based at least in part on determining that the threshold amount of time has passed since the last time when the first BTMS unit was actively operated.

5. The machine of claim 1, wherein the BTMS further comprises:
a first BTMS module, the first BTMS module including the first BTMS unit and the second BTMS unit; and
a second BTMS module including a third BTMS unit and a fourth BTMS unit, wherein the BTMS controller is configured to independently operate the third BTMS unit and the fourth BTMS unit.

6. The machine of claim 5, wherein the BTMS controller is further configured to:

receive, at a first time, a second temperature level associated with a battery;

identify a third active operating time associated with the third BTMS unit;

identify a fourth active operating time associated with the fourth BTMS unit;

determine, based at least in part on the second temperature level, the third active operating time, and the fourth active operating time, that the fourth BTMS unit is to be actively operated; and cause the fourth BTMS unit to actively operate.

7. The machine of claim 6, wherein the BTMS controller is further configured to:

receive, at a second time after the first time, a third temperature level associated with the battery;

determine, based at least in part on the third temperature level, that both the third BTMS unit and the fourth BTMS unit are to be actively operated; and cause the third BTMS unit and the fourth BTMS unit to actively operate.

8. The machine of claim 1, wherein the BTMS controller is further configured to:

receive, at a first time, a second temperature level associated with the battery;

determine based at least in part on the second temperature level that the battery is to be heated; and cause the battery to be heated.

9. The machine of claim 1, wherein the BTMS controller is further configured to:

control a first pump to pump coolant through the first BTMS unit.

* * * * *